H. K. SANDELL.
MUSIC SHEET FEEDER.
APPLICATION FILED DEC. 18, 1914.
1,302,439.
Patented Apr. 29, 1919.
15 SHEETS—SHEET 1.
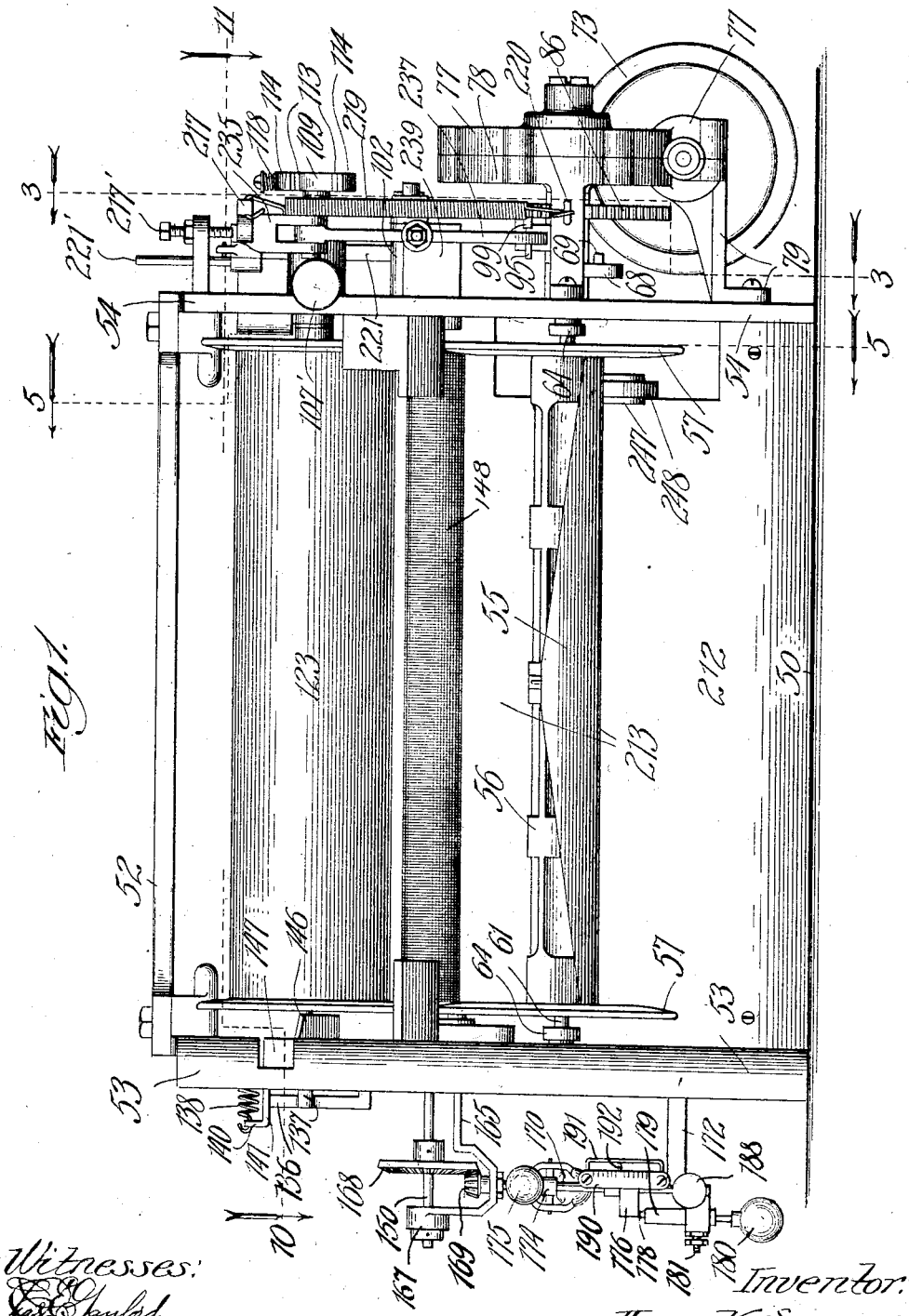
Witnesses:
Inventor:
Henry K. Sandell,
By Dyrenforth, Lee, Chritton and Wiles.

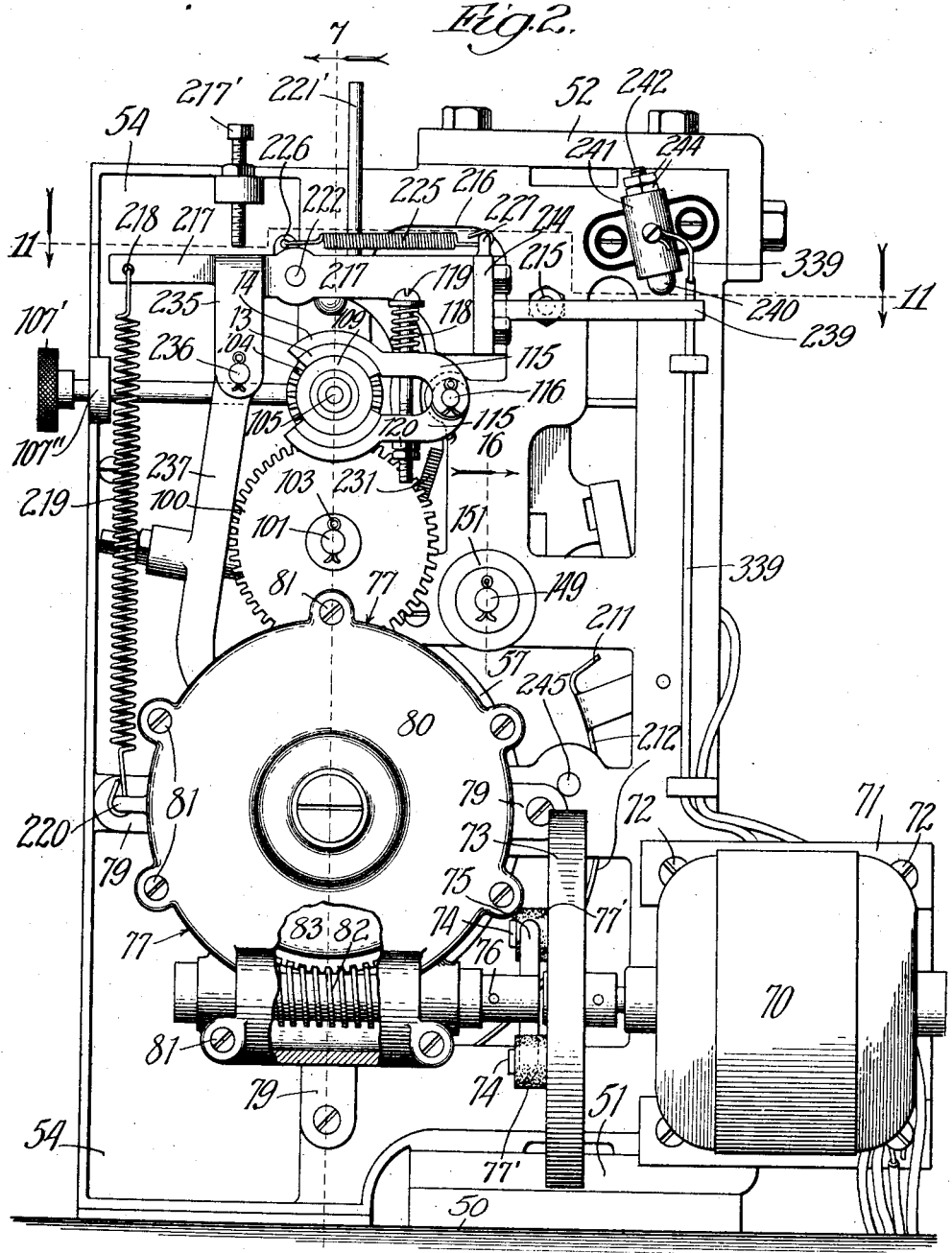

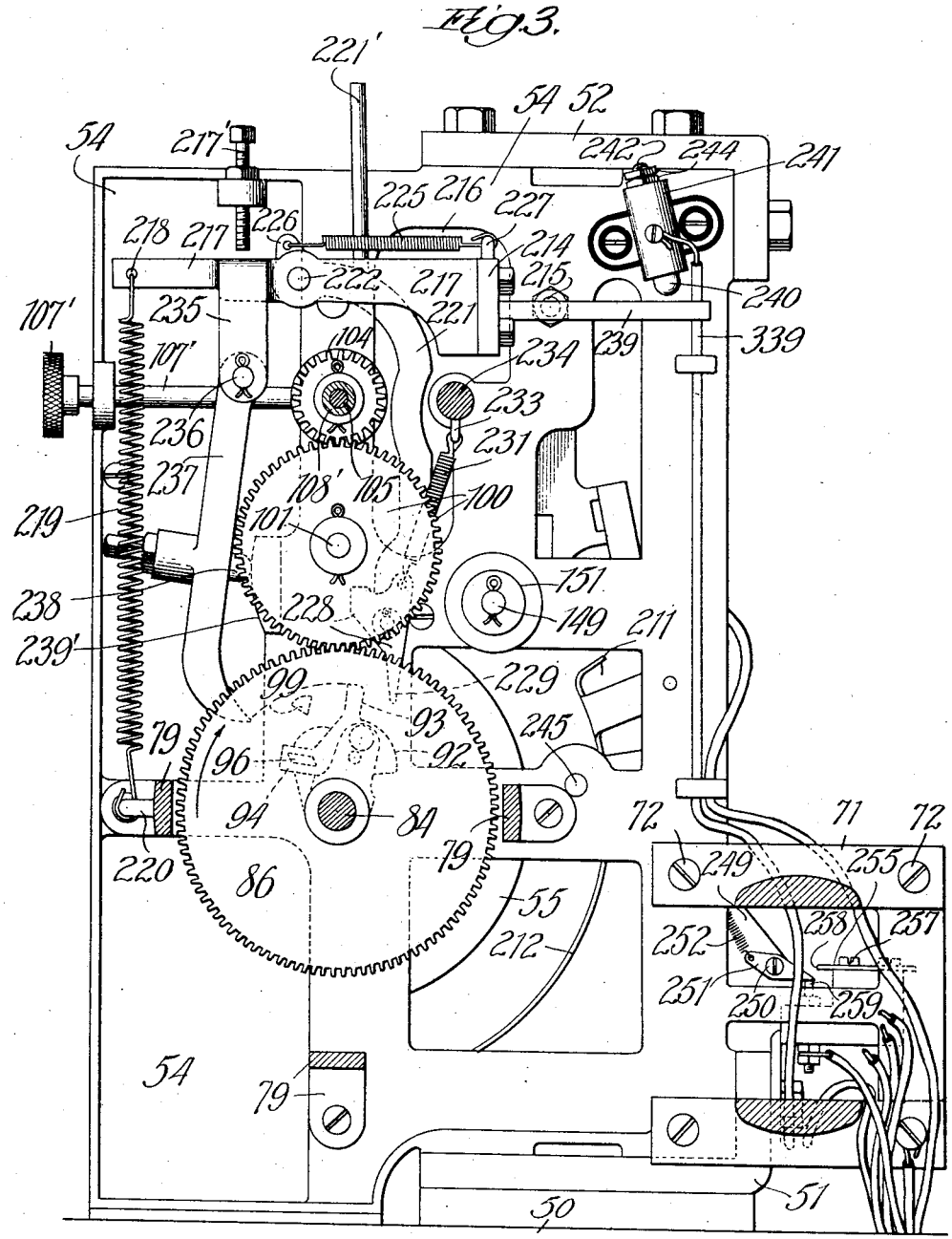

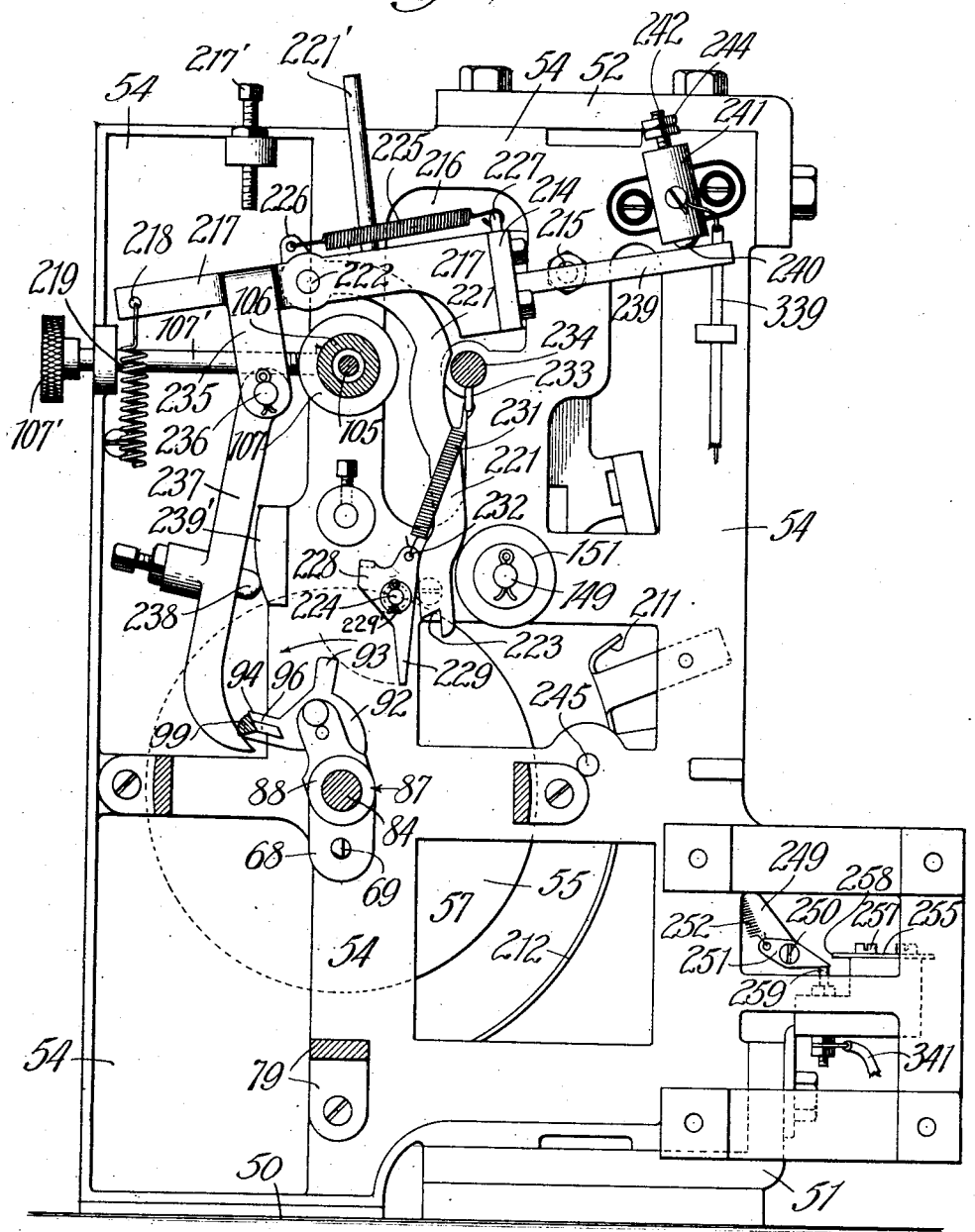

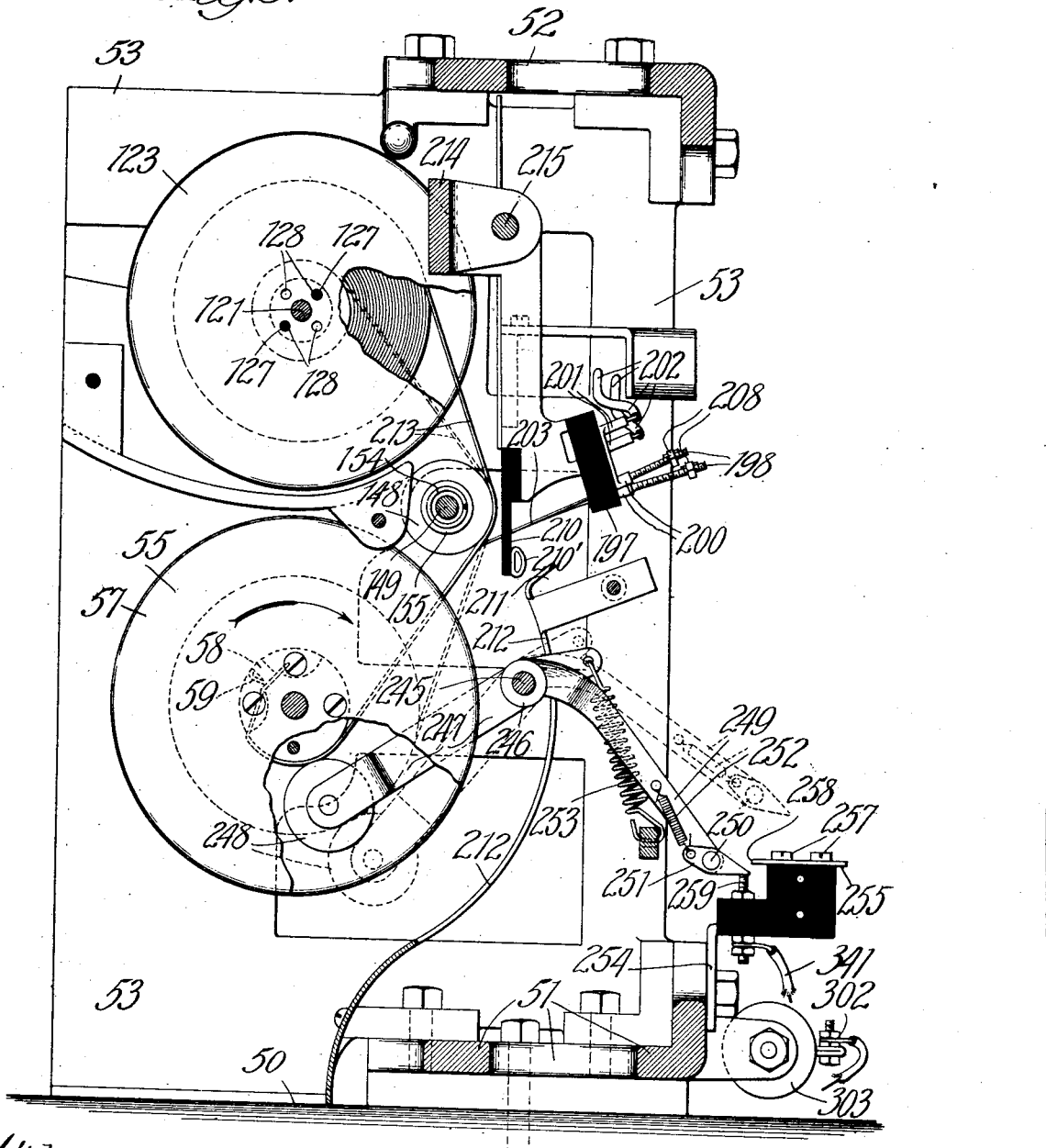

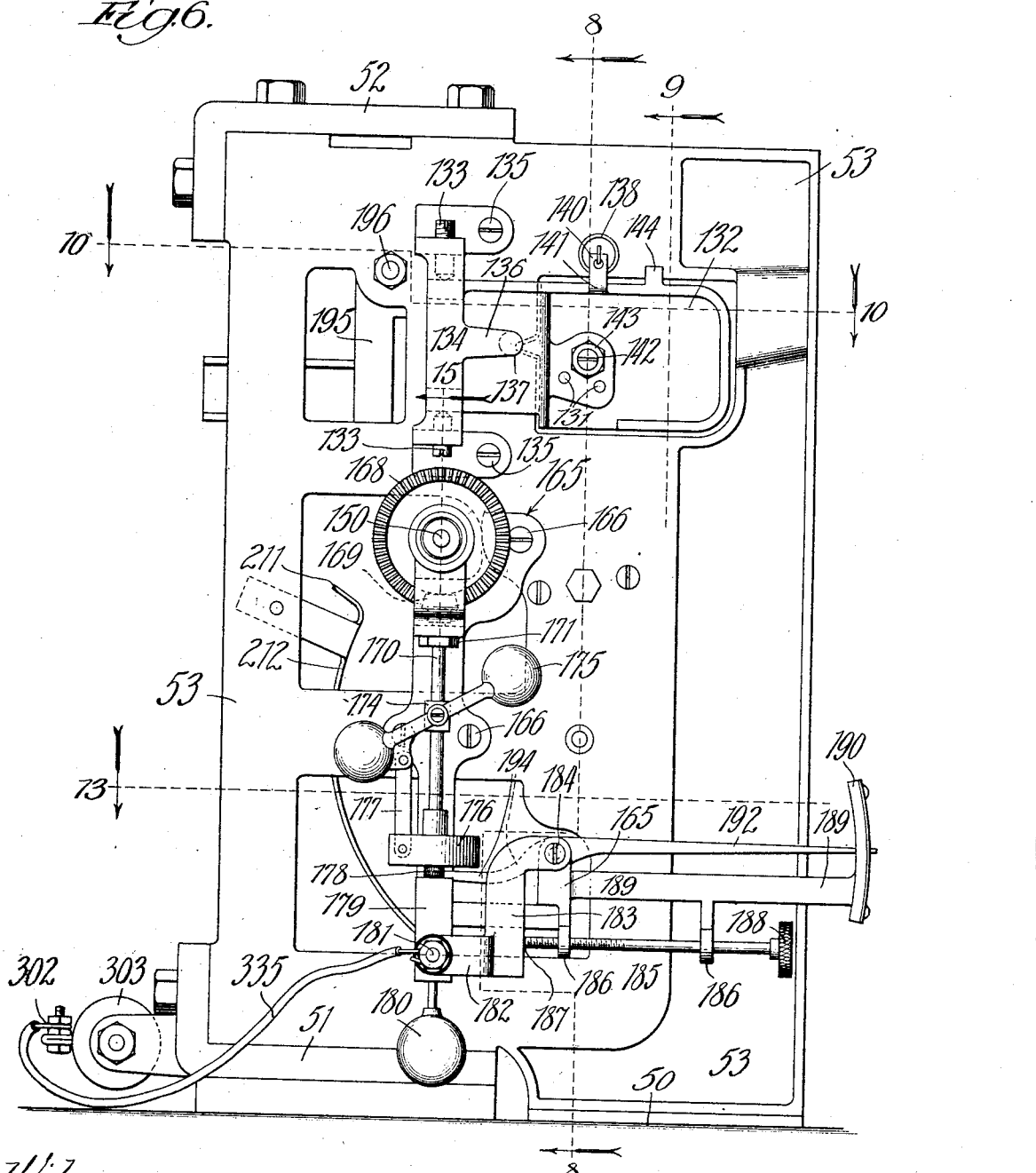

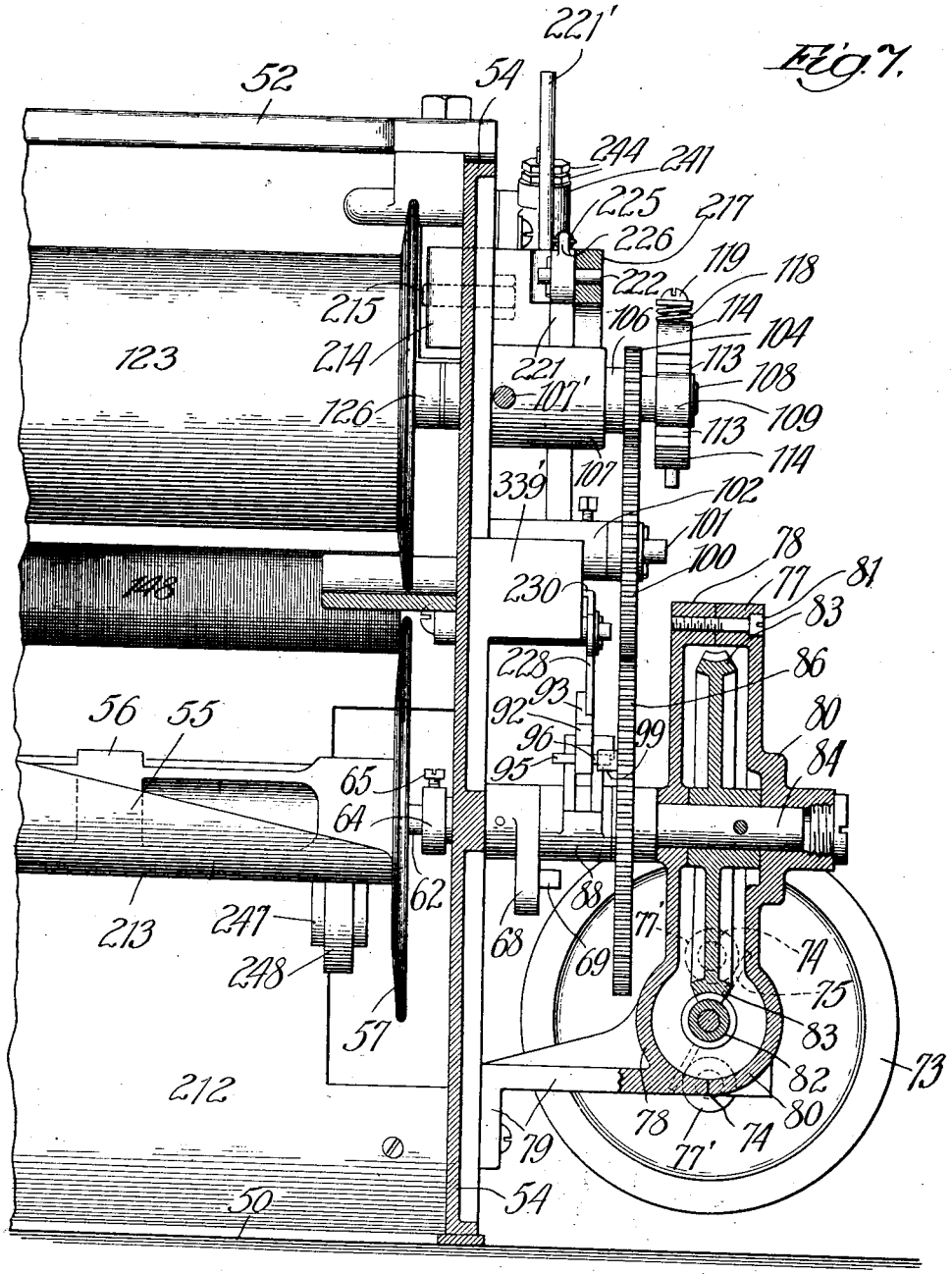

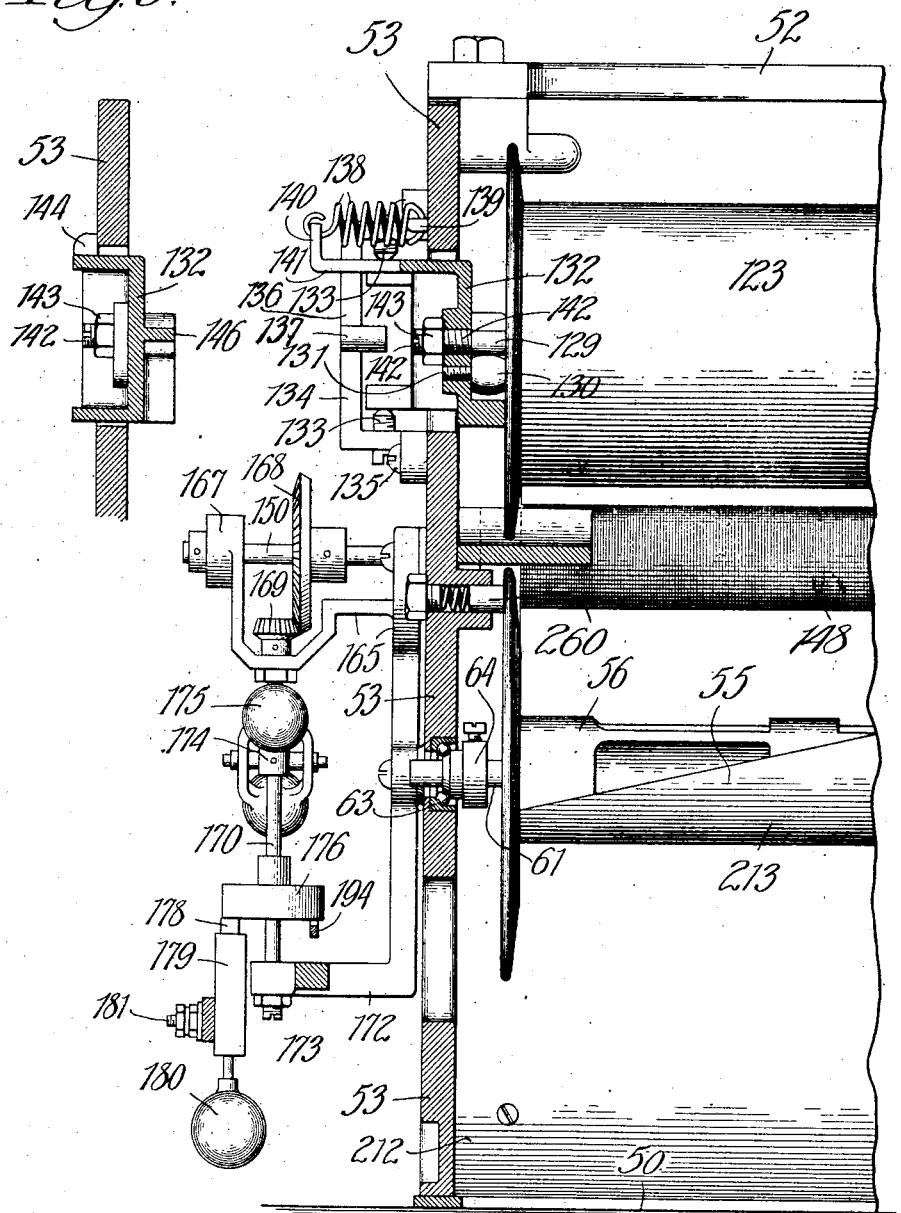

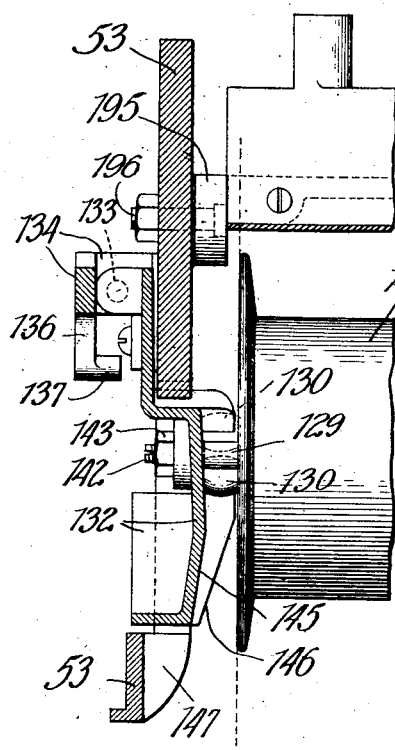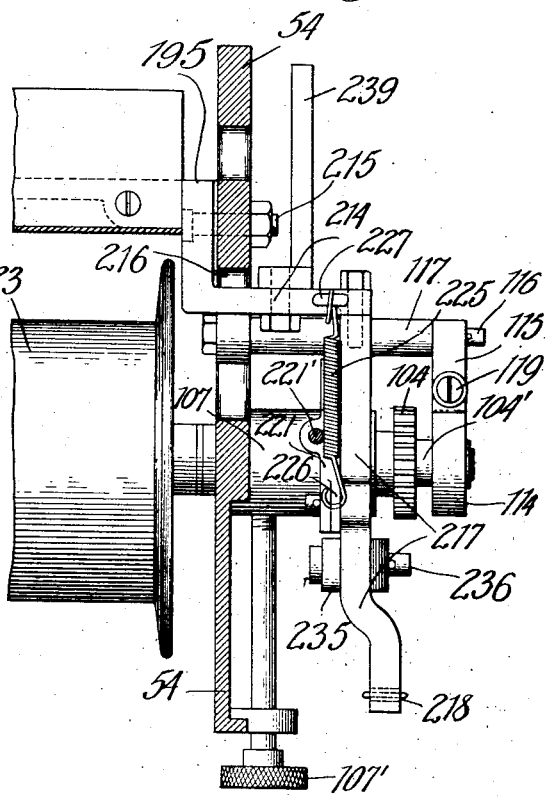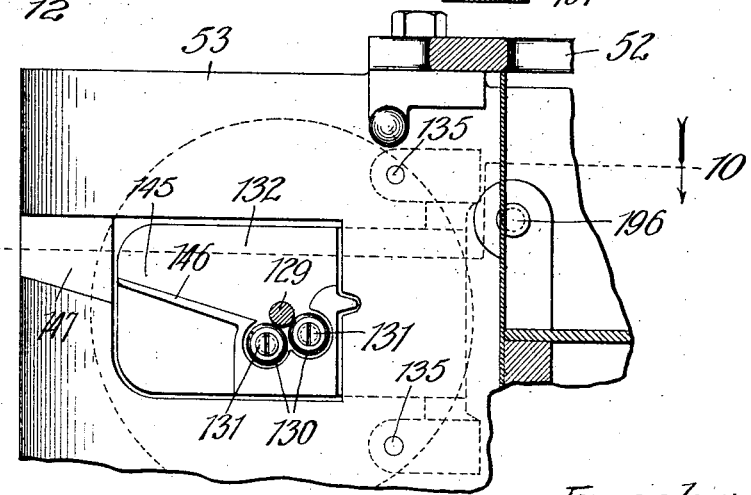

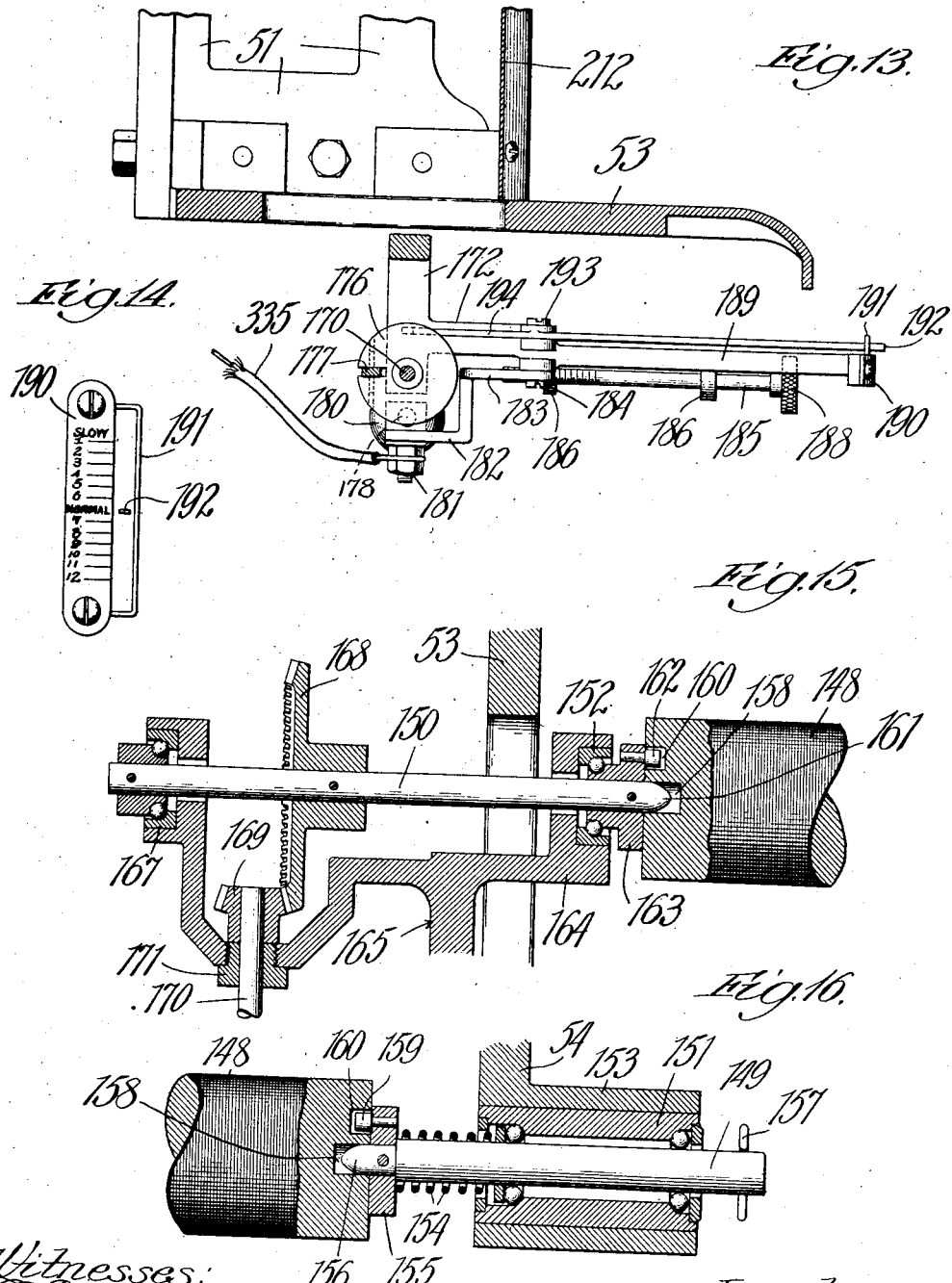

H. K. SANDELL.
MUSIC SHEET FEEDER.
APPLICATION FILED DEC. 18, 1914.
1,302,439.
Patented Apr. 29, 1919.
15 SHEETS—SHEET 11.
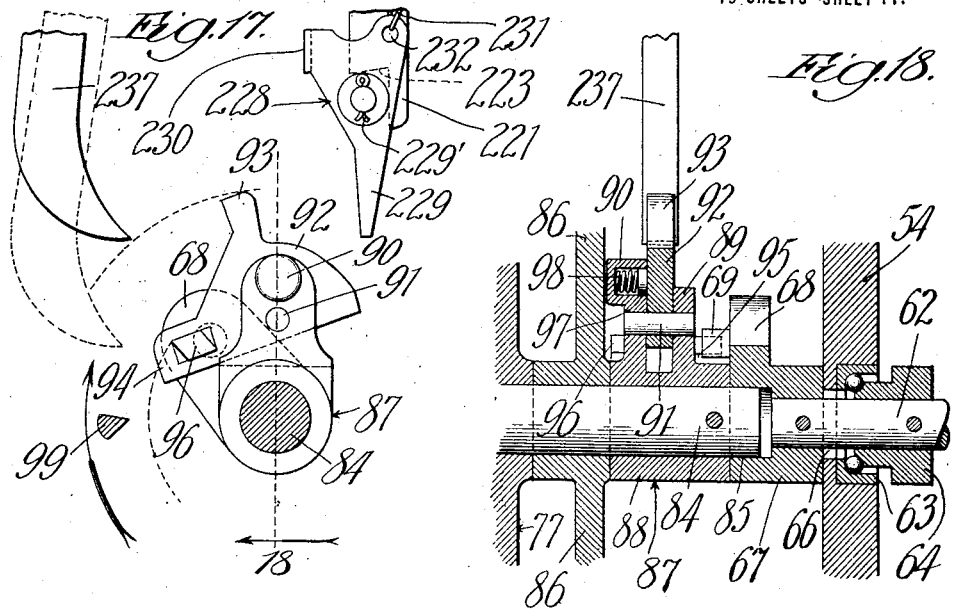
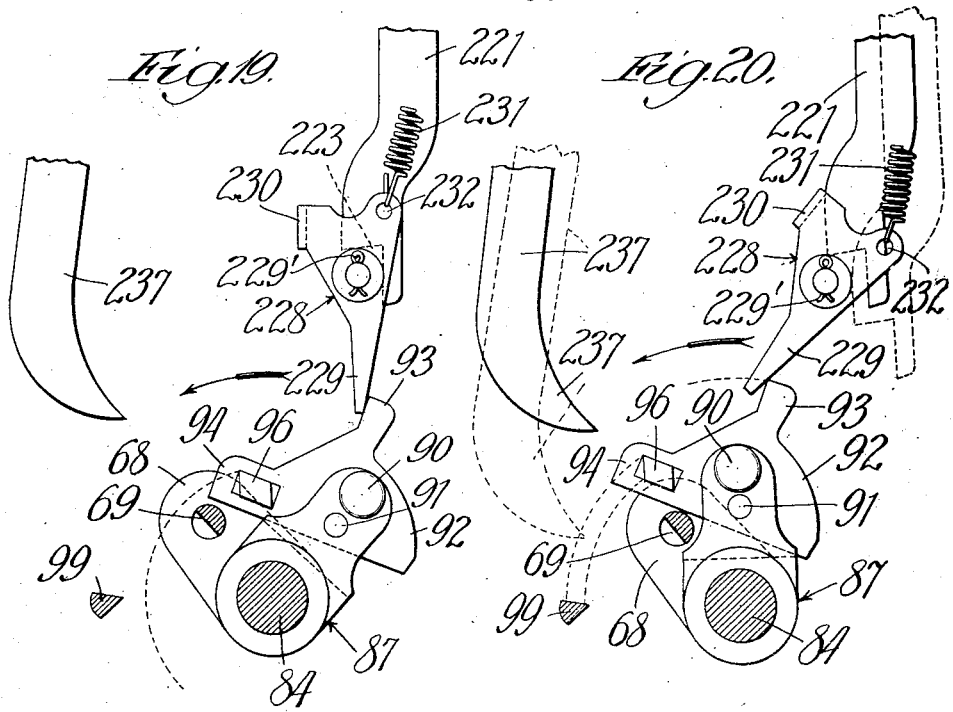

H. K. SANDELL.
MUSIC SHEET FEEDER.
APPLICATION FILED DEC. 18, 1914.
1,302,439.
Patented Apr. 29, 1919.
15 SHEETS—SHEET 12.
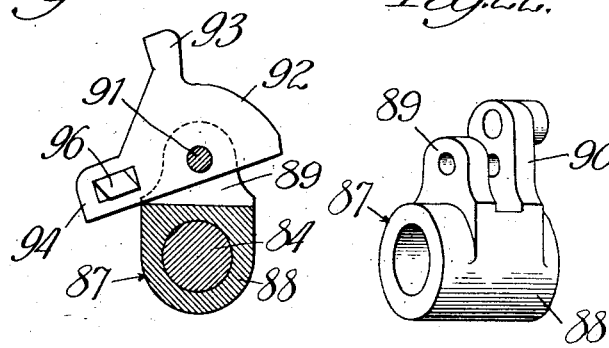
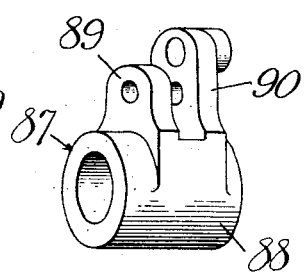
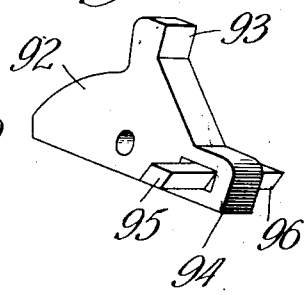
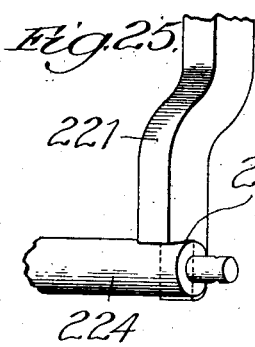
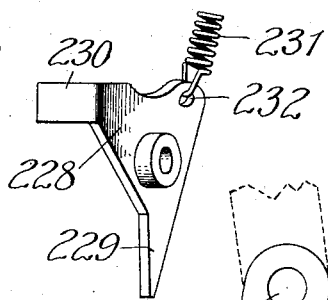
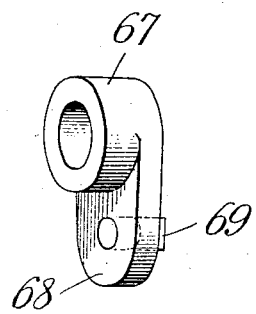
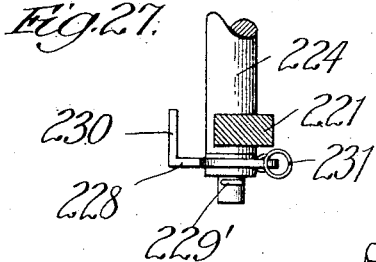
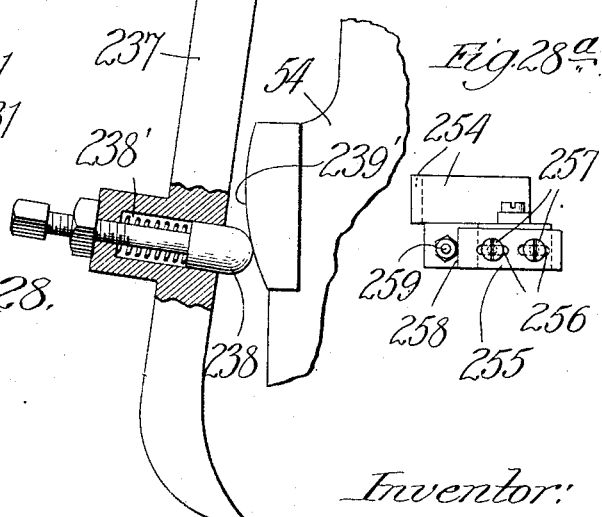
Witnesses:
Inventor:
Henry K. Sandell,

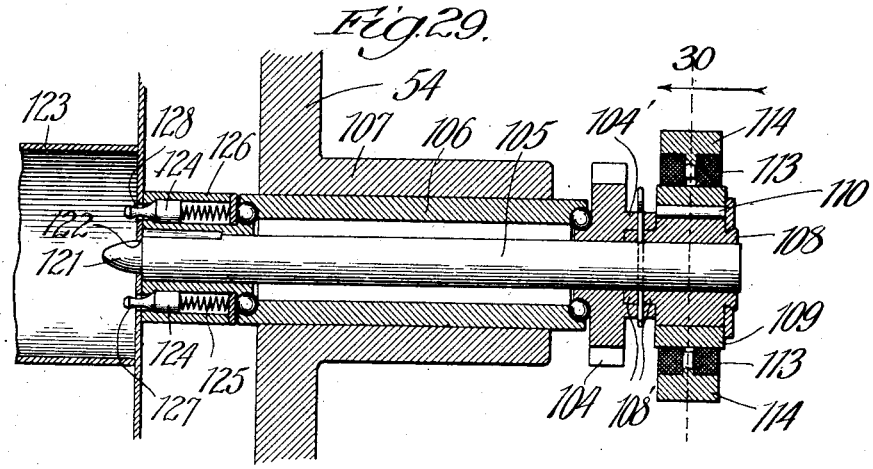
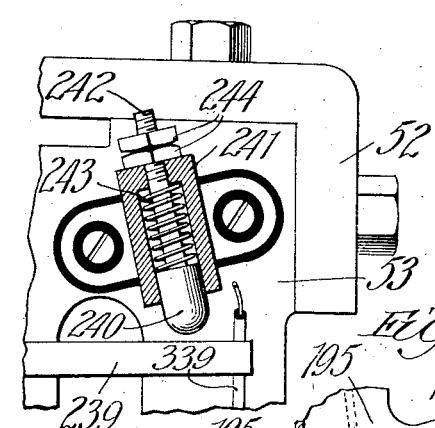
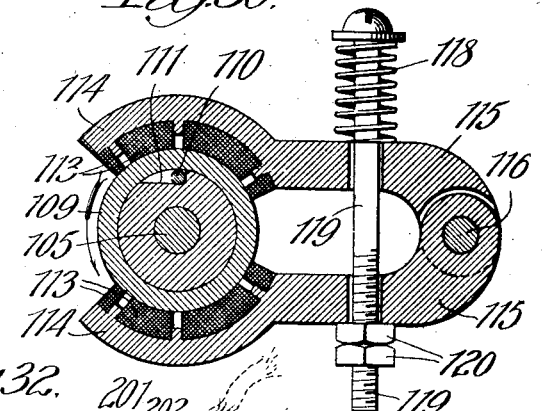
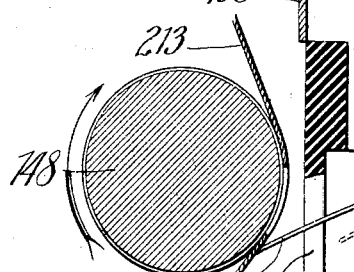
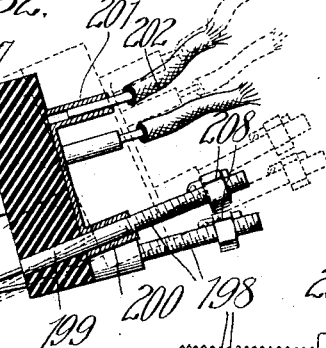

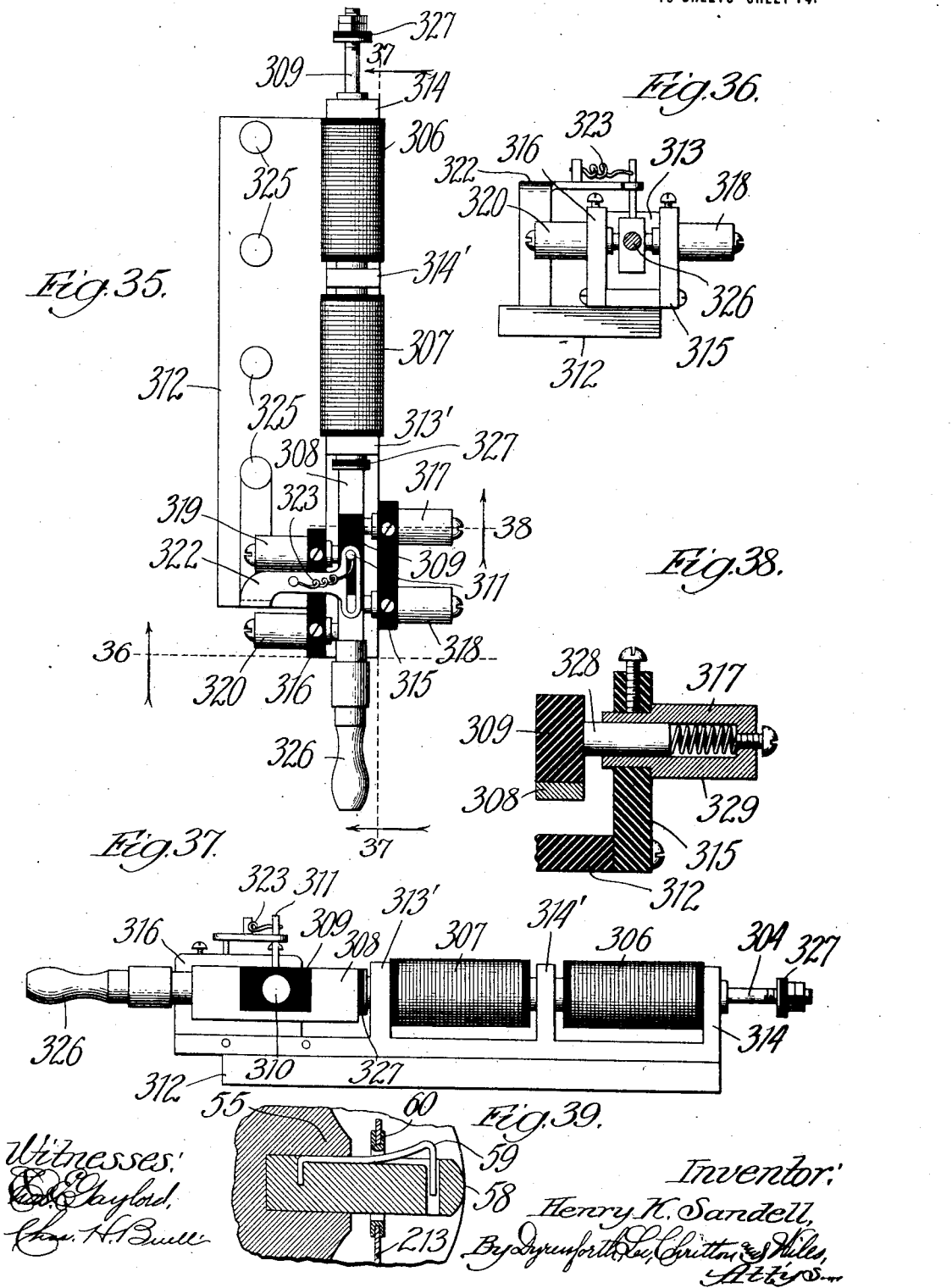

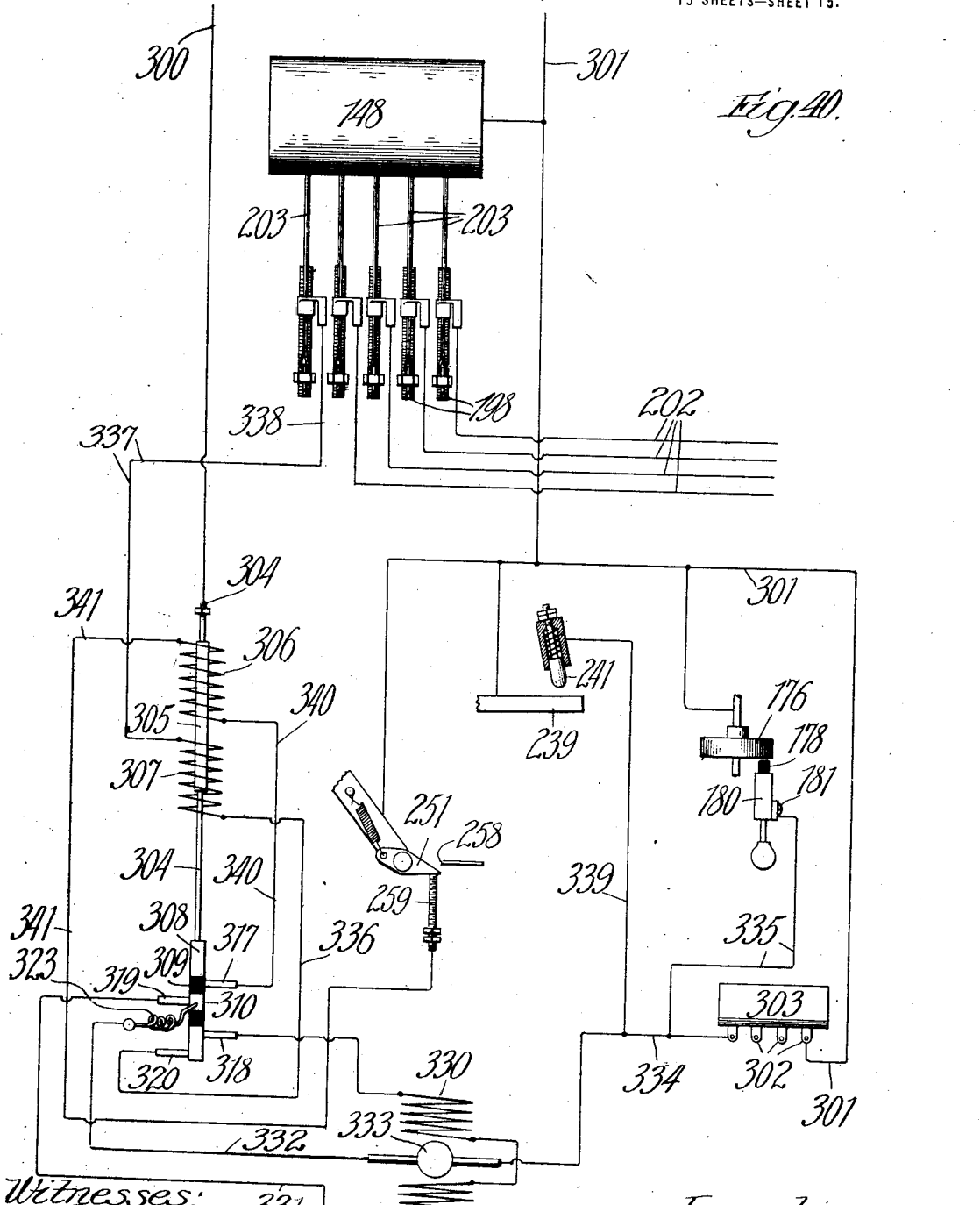

UNITED STATES PATENT OFFICE.

HENRY K. SANDELL, OF CHICAGO, ILLINOIS, ASSIGNOR TO HERBERT S. MILLS, OF CHICAGO, ILLINOIS.

MUSIC-SHEET FEEDER.

1,302,439.  Specification of Letters Patent.  Patented Apr. 29, 1919.

Application filed December 18, 1914.  Serial No. 877,846.

*To all whom it may concern:*

Be it known that I, HENRY K. SANDELL, a citizen of the United States, residing at Chicago, in the county of Cook and State of Illinois, have invented a new and useful Improvement in Music-Sheet Feeders, of which the following is a specification.

My invention relates to improvements in electrically-operated controlling-devices of the type used in connection with mechanical musical instruments. More particularly, the invention is concerned with a form of controller and driving mechanism adapted to be used in combination with perforated record sheets for reproducing music. In machines of this general class, it is common to provide a record in the form of a perforated strip of paper or fabric which is wound upon one roll for purposes of handling, and when in use is unwound from this roll, which will be called the music-roll, and wound upon a second roll, called the feed or take up roll, the intermediate portion of the sheet or strip between the two rolls being used to actuate or control the actuation of the mechanical devices by which the musical instrument is caused to operate. In such devices as I have described, it has been common to provide various means whereby the feeding mechanism of the music-sheet is automatically stopped when the end of the sheet is reached. It is a principal object of my invention to provide a form of feed-controller for the music-sheet which will not only cause the sheet to stop automatically when the end of the perforated record, or active part thereof, has been reached, but will further operate to automatically re-wind the sheet upon the music-roll. It is a further object of the invention to provide in combination with such re-winding mechanism a means by which the feed-roll is caused to resume automatically its feeding motion when the music-sheet has been completely rewound. With my mechanism it thus becomes possible to insert a music-roll in the mechanism and to start the same, and the mechanism will automatically function thereafter to feed the music-sheet or strip from the roll until the end of the sheet is reached, then re-wind the sheet, and then automatically feed the music-sheet through the mechanism again, and this process of feeding, re-winding and feeding again continues automatically until the mechanism is stopped.

In designing a mechanism embodying this principle of operation I have effected numerous other improvements in the construction and operation of a machine of the general type described. These further objects and advantages of my design will be brought out in connection with the following detailed description of a form of music-sheet feeding and governing-device which embodies the invention. In describing this particular embodiment of my invention, reference will be had to the accompanying sheets of drawings, in which—

Figure 1 is a front elevation of my improved machine; Fig. 2 is an end elevation of the same, certain portions of the casing being broken away to disclose more clearly the construction of the parts; Fig. 3 is a section of that end of the machine shown in Fig. 2 and taken on the line 3—3 of Fig. 1; Fig. 4 is a similar section but with the parts shown in winding position and with the gear wheels removed to show the construction of the driving-dog parts; Fig. 5 is a section on the line 5—5 of Fig. 1; Fig. 6 is an end elevation of the opposite end of the machine; Fig. 7 is a front elevation, partly in section, of the end of the machine shown in Fig. 2; the section being taken on the line 7—7 of Fig. 2; Fig. 8 is an elevation, partly in section, of the opposite end of the machine, the section being taken on the line 8—8 of Fig. 6; Fig. 9 is an enlarged detail section on the line 9 of Fig. 6; Fig. 10 is a detail sectional view taken on planes indicated by the lines 10 in Figs. 1, 6 and 12; Fig. 11 is a detail section taken on the line 11 of Figs. 1 and 2; Fig. 12 is an elevation, partly in section, of the inside of the end-casting of the frame taken on the line 12 of Fig. 10; Fig. 13 is a horizontal section through the frame of the machine and the governor taken on the line 13 of Fig. 6; Fig. 14 is an enlarged detail elevation of the regulator scale; Fig. 15 is an enlarged detail section of the governor driving-gear; Fig. 16 is an enlarged detail section of the free end of the contact-roll; Figs. 17, 19 and 20 are enlarged vertical sectional views of the compound dog and the trips actuated thereby in three different positions of the mechanism; Fig. 18 is an enlarged sectional view of the compound dog taken on the line 18 of Figs. 17 and 19; Fig. 21 is a section of the compound dog; Figs. 22 and 23 are perspective views of the two members which make up the compound-dog; Fig. 24 is a perspective view of the feed-roll driving-crank; Fig. 25 is a detail perspective view of the brush-bar frame support; Fig 26 is a detail perspective view of the trip for the brush-bar frame support shown in Fig. 25; Fig. 27 is a section through the brush-bar frame support and showing the relation of the trip thereto in the assembled position of the parts; Fig. 28 is an enlarged detail elevation, partly in section, of the push-rod or foot which raises the brush-bar; Fig. 28ᵃ is a detail plan view of the adjustable trip plate; Fig. 29 is an enlarged broken central section taken on the line 7 of Fig. 2; Fig. 30 is a section of the music-roll brake taken on the line 30 of Fig. 29; Fig. 31 is an enlarged elevation of the upper right-hand corner of the frame, as shown in Figs. 2 to 4, the short-circuiting contact being shown in section; Fig. 32 is an enlarged detail section through the brush-bar, contact-roll and music-sheet, showing the relative positions of these parts; Fig. 33 is an enlarged section through one end of a brush-holder; Fig. 34 is an enlarged detail plan view showing the manner in which the brush is carried in the holder; Fig. 35 is a top plan view of my automatic reversing-switch; Fig. 36 is a section on the line 36 of Fig. 35; Fig. 37 is a section on the line 37 of Fig. 35; Fig. 38 is a section on the line 38 of Fig. 35; Fig. 39 is an enlarged detail section of the music-sheet fastener on the winding-roll or take up roll; and Fig. 40 is a diagrammatic showing of the electrical connections of the machine.

Mechanical construction.

Referring more particularly to the drawings, the numeral 50 designates a supporting-table or bench on which is mounted the frame of my machine. This frame is preferably made of four main castings, i. e., a bottom casting 51, a top casting 52, and end castings 53 and 54. Journaled horizontally between the end castings 53, 54 is the feed-roller winding or take up roll 55 of my invention. This roller is preferably constructed of a cast aluminum core designated 56, provided with end-flanges 57. It is desirable, however, to provide a certain frictional resistance to the re-winding operation in order that the music-sheet may be wound tightly and uniformly. This resistance is provided by a small spring-pressed plunger 260 (see Fig. 8) which is mounted in a boss in the end-casting 53 and bears against the end-flange of the feed or take up roll 55.

To attach the end of the music-sheet to the core 56 I preferably provide a stud 58 tapped into the body of the roller and carrying a spring-wire retaining-device of the form indicated at 59 in Fig. 39. This spring-wire may be depressed by the finger of the operator to permit the eyelet 60, which is commonly secured in the end of the music-sheet to be passed over the stud, the spring-wire returning to the position in which it is shown in Fig. 39 after the eyelet has come in contact with the core. By this simple means the end of the music-sheet is effectively held and at the same time may be very easily removed.

Referring to Figs. 7 and 8, it will be seen that the feed-roller is provided at its ends with the extending stub-shafts 61 and 62, respectively, which are mounted in ball-bearings 63 carried by the end-plates 53 and 54. Thrust-collars 64 carried on these stub-shafts and secured thereto as by set-screws 65, permit of the feed-roll or winding-roll being adjusted axially and maintained in any position of adjustment. The stub-shaft 62 extends through an opening 66 in the end-plate 54 (see Fig. 18) and on its projecting end is pinned a hub-boss 67 which carries a crank-arm 68, in which is mounted a driving-stud or crank 69. This stud is driven from the compound dog, as will later appear.

The power for driving my machine is preferably supplied by a small electric motor, designated generally at 70, this motor being mounted on a rearwardly-extending portion 71 of the end-casting 54, the motor-base being secured to the casting by any suitable means, such as bolts 72, shown in Fig. 2. The armature-shaft of the motor carries at its front end a small fly-wheel 73, in the front face of which are secured the driving-studs 74. These studs engage the T-head 75 of a worm-shaft 76, the studs being preferably cushioned, as by felt tubes 77′ slipped over the studs, so that the engagement of the studs with the T-head 75 shall be without shock and noiseless. The worm-shaft 76 is journaled in suitable bearings (not shown) which are carried by a housing 77, best shown in Figs. 1, 2 and 7. As will be seen from these figures, the housing is made up of two castings, the inner casting 78 carrying a bracket 79 which is bolted to the lower end of the end-casting 54 and the outer casting, designated 80, secured to the inner half as by cap-screws 81. That portion of the worm-shaft 76 lying within the housing 77 is provided with a driving worm-gear 82, which meshes with a worm-wheel 83 pinned to a horizontal-shaft 84 (see Fig. 18) which is journaled in plain bearings in the housing and extends outwardly therefrom through the inside housing-casting 78 and alines with the stub-shaft 62 of the feed-roll or winding-roll 55. I preferably bore out the opening in the hub-boss 67 which is mounted on the stub-shaft 62 in order to provide a bearing 85 for the projecting end of the worm-wheel shaft 84. Between its bearings 85 and the bearing formed by the inside casting of the housing 77, the worm-wheel shaft carries loosely thereon the re-winding gear 86. Mounted on the shaft 84 between the re-winding gear 86 and the hub-boss 67 is the compound dog which forms an important part of my invention. This dog, designated generally by the numeral 87, is made up of two relatively movable members, i. e., a member 88 in the form of a hollow cylinder which is pinned to the shaft 84 and carries spaced cranks 89 and 90 between which passes the crank pin 91 on which is journaled the second member of the dog. The exact construction of these parts will be seen best by reference to Figs. 17 to 24. From these views it will be seen that the second member of the dog designated 92 is of general triangular form, the one angle of the triangle being formed as a toe 93 and another angle as a toe 94 carrying on its side faces projecting lugs 95 and 96. The dog member 92 is pivoted loosely on the crank-pin 91 but is frictionally held against accidental or gravity displacement by a small brake-shoe 97 mounted in the hollow extremity of the crank-arm 90 and pressed against the dog-member by a light spring 98. That face of the re-winding gear 86 which is adjacent the dog 87 is provided with a driving-stud 99 which is adapted to be engaged by the dog, as will later appear. Without considering at the present time the exact manner of operation of the compound dog, it will be assumed for the purposes of further description that this dog will operate to drive the crank-arm 68 and through it the winding or feed-roll shaft 62 when the worm-wheel shaft 84 is revolved in one direction, and will disengage itself from the crank 68 and engage and drive the re-winding gear 86 when the worm-wheel shaft 84 is rotated in the opposite direction.

Referring now to Figs. 2 and 3, it will be seen that the re-winding gear 86 meshes with an idler 100 journaled on a shaft 101 carried in a boss 102 cast integrally with the end-plate 54, a cotter-pin or other simple fastening means, shown at 103, being utilized to maintain the idler 100 in position. The idler 100 in turn transmits power to a pinion 104 mounted on a shaft 105 (see Fig. 29) which is journaled in a double annular ball-bearing 106 carried by the hollow boss 107 of the end-casting 54, a set-screw 107' holding the bearing within the boss 107 (see Fig. 4). The outer end of the shaft 105, which will be called the music-roll drive-shaft, carries in addition to the pinion 104 a roller-clutch comprising a central cylindrical member 108 and an outer ring 109, the two parts having a loose fit so that the inner member may turn freely in one direction, and being adapted to be locked together as by a roller 110 operating in a notch 111 in the inner member when the latter turns in the other direction. The construction and operation of such clutches is well known, and since I make no claim of invention as to this particular part of my apparatus, I will not describe the same in any greater detail. As a convenient method of mounting the roller-clutch, I prefer to provide the inner member 108 with a reduced neck-portion 108' over which the counter-bored hub 104' of the pinion 104 is sleeved, the pinion, clutch-member and shaft being thus secured together by a single pin 112. The outer ring 109 of my clutch-member serves as a brake-drum against which bear the opposed leather brake-shoes 113 which are carried by the curved ends 114 of a pair of arms 115, which are mounted on a common pivot 116 carried by a stud 117 screwed into a proper tapped opening in the end-casting 54. (See Fig. 11). The brake-shoes 113 are held in frictional contact with the ring 109 by a coil spring 118 surrounding a through bolt 119, as shown in Fig. 30, and the pressure with which the brake-shoes engage the ring may be adjusted by the nut and lock-nut 120 of the bolt 119 in an obvious manner.

The inner end of the music-roll driving-shaft 105 is reduced and pointed, as shown at 121 (Fig. 29) to engage a suitable aperture 122 in the end of a music-roll 123. In order that the music-roll may be driven from the shaft 105, I provide driving-connections in the form of spring-pressed plungers 124 mounted in the cylindrical bores 125 of a plug 126, which is pinned to the end of the shaft 105. The outer ends of the plungers 124 are reduced, as shown at 127, and are adapted to enter perforations 128 in the end of the music-roll and to serve as a driving means for the same. I prefer to provide my music-rolls with two sets of apertures 128, as will be seen in Fig. 5, so that in any position of the roll an angular movement of 45° or less will be sufficient to permit the driving plungers 127 to engage the roll.

Referring now to Figs. 1–10, 11 and 12, it will be seen that the music-roll 123 is mounted horizontally between the end-castings 53, 54 and parallel to and above the winding-roll or feed-roll 55. The right-hand end of the music-roll, as seen from Fig. 1, is carried by the projecting end 121 of the shaft 105. The opposite end of the roll is preferably provided with a stub-shaft 129 which rests between two bearing-rollers 130 journaled on cap-screws 131 which are fastened to the inner face of the pivoted bearing-plate 132 (see Figs. 8, 10 and 12). As best shown in Fig. 8, the bearing-plate is pivoted at its rear extremity between pointed screws 133 secured in a base 134 bolted to the end-plate 53, as by the screws 135. Adjacent its central portion the base 134 has formed thereon an outwardly-extending arm 136 which carries a stop 137 which limits the outward swing of the pivoted plate 132. This plate is normally pressed inward by a tension-spring 138 which is stretched between an eye 139 secured to the end-plate 53, and an eye 140 formed in an arm 141 which projects outwardly over the face of the bearing-plate 132. The portion of the bearing-plate 132 which alines with the stub-shaft 129 in the end of the music-roll is drilled and tapped to receive an adjusting-screw 142, which bears against the end of the stub-shaft 129. The adjusting-screw is provided with the usual slotted head and with a lock-nut 143. It is the purpose of this screw to serve as an adjustable thrust-bearing and to maintain the music-roll in its proper position axially. As a stop to limit the inward swinging motion of the pivoted bearing-plate 132, the latter is provided with an outwardly extending lug 144 which lies over and engages the outer face of the casting 53 (see Fig. 9).

Referring to Fig. 10, it will be seen that the inner face of the pivoted bearing-plate 132 is inclined toward the front, as shown at 145, and on this face is formed a horizontal rib 146, shown in Figs. 10 and 12, which facilitates the operation of inserting and removing the music-roll. It will be seen from these same figures that the end-casting 53 of the frame is provided with an inwardly-facing recess 147 substantially in alinement with the rib 146.

Journaled horizontally between the music-roll 123 and the winding or feed-roll 55 is the contact-roll 148 (see Fig. 1). Referring now to Figs. 15 and 16, it will be seen that the contact-roll is mounted on stub-shafts 149 and 150 carried, respectively, by the ball-bearings 151 and 152. The ball-bearing 151 on which the shaft 149 is mounted is housed within a hollow boss 153 cast integrally with the end casting 54. This shaft 149 is movable axially in its bearing, a coil spring 154 which bears against a collar 155 pinned upon the reduced end 156 of the shaft being used to urge the shaft 149 inward. A cotter-pin 157 in the outer end of the shaft limits the movement of the same in this direction by contacting with the outer end of the bearing 151. The reduced end 156 of the shaft 149 is adapted to enter a central recess 158 in the contact-roll 148, and a headed pin 159 secured in the collar 155 engages a second recess 160 in the end of the contact-roll 148. The opposite end of the contact-roll is similarly supported, being provided with recesses 158 and 160 to receive, respectively, the tapered extremity 161 of the shaft 150, and the headed pin 162 secured in the collar 163 which is pinned to the shaft 150 and forms the cone of the ball-bearing 152. It is to be noted that the contact-roll is readily removable, the stub-shaft 149 which carries the right end of the roll, as viewed in Figs. 1 and 7, being free to move axially outward against the spring 154. The reduced end 156 of the stub-shaft and the locking or driving pin 159 carried by the stem (see Fig. 16) may thus be disengaged from the contact-roll to permit the latter to be removed or inserted. Instead of being mounted directly in the end-casting 53, the ball-bearing 152 is carried by an arm 164 which is a part of a separate casting 165, which I shall call the governor frame. This casting is secured, as by bolts 166, to the outer face of the frame-member 53 (see Fig. 6) and carries a ball-bearing 167 in line with the ball-bearing 152 and supporting the outer end of the stub-shaft 150. Between the bearings 152 and 167 (Fig. 15) the stub-shaft is provided with a bevel gear 168, which is pinned to the shaft, meshing with a bevel pinion 169 on the end of a vertical shaft 170 journaled in a bronze bushing 171 screwed into the governor frame casting. The lower end of the shaft 170, which I shall call the governor shaft, is supported in a bracket 172 at the foot of the governor frame casting (see Fig. 8), a bearing-screw 173 being provided to abut against the lower end of the governor shaft. The bearing-screw may be adjusted vertically in an obvious manner to maintain the governor-shaft in its proper position. Between the bearings 171 and 173 the governor-shaft carries a cross-bar 174 (Fig. 8) on the ends of which is journaled the wabble governor 175 (see Fig. 6). Below the governor 175 a sliding collar 176 is mounted upon the governor-shaft, the collar and the governor being connected by a link 177 so that as the governor assumes a horizontal position under the action of centrifugal force the collar 176 may be lifted. The collar 176 is adapted to bear on its lower face against a contact-brush 178 mounted in the upwardly projecting end 179 of a pendulum 180. This pendulum is pivoted on a bolt 181 (see Figs. 8 and 6) which is carried by, and insulated from, the depending arm 182 of a lever 183 pivoted on a screw 184 secured in the governor-frame 165. The angular adjustment of the pivoted arm 183 is fixed by the governor-screw 185 which passes through and is threaded into depending brackets 186 formed on the governor-frame 165 and has its point 187 bearing against the depending arm 182 which carries the pendulum 180. The governor screw 185 extends forwardly and substantially to the front of the frame and on its front end is provided with a knurled head 188 by which it may be turned.

It will be seen that as this screw is threaded in and out, the arm 183 will be swung about its pivot 184 and the pendulum 180 will thereby be raised or lowered. This screw and its relation to the parts which I have just described is illustrated best in Fig. 13, in which it will be seen that the screw 185 lies parallel to and below a forwardly-extending arm 189 formed upon the governor-frame casting 165. The front end of this arms carries a governor-scale 190 (see Figs. 13, 14 and 6), suitably graduated, as shown in Fig. 14, and carrying at one side thereof a guide 191 for a pointer-arm 192 which lies parallel to and above the scale-arm 189 (see Fig. 6.) and is pivoted to the casting 165 by a screw 193 (Fig. 13). The rearwardly-extending portion 194 of the pointer-arm lies under and bears against the lower face of the sliding collar 176. The pointer-arm 192 therefore indicates on the scale 190 the position of the sliding collar 176.

Lying directly back of and parallel to the contact-roll 148 is a swinging-frame 195, the upwardly-extending arms of which are pivoted to the end-castings 53, 54 (see Fig. 5, in which the numeral 215 designates the pivot in the casting 54). At its lower or free end the frame 195 carries a strip 197 made of fiber or other insulating material, in which strip there are mounted a plurality of brush-holders 198 (see Figs. 5, 32 and 33) in the form of hollow metal tubes threaded externally, as shown in Fig. 33, the tubes being secured in the strip 197 by being let into bores 199 perforating the strip. The brush-tubes are preferably arranged in two rows, one slightly above the other, as shown in Fig. 32, the tubes of the two rows being inclined at a slight angle to one another so that the brushes which are mounted within the tubes may lie in a single line at their contact terminals. Each brush-holder has threaded on the stem thereof a metallic nipple 200 which carries a connector 201 by which the lead-wire 202 may be connected with the brush. The brushes themselves consist of pieces of tempered resilient steel wire, designated 203, bent in the form of a hair-pin, as shown in Fig. 34, so that each brush has two contact points, the loop of the hair-pin passing through an eye 204 formed in a key 205 which slides in a key-way 206 in the brush-tube (see Fig. 33). The key 205 is of greater depth than the key-way, and the projecting part of the key is recessed, as shown at 207, to embrace an adjusting-nut 208 threaded upon the brush-tube, and it will be obvious that as the nut 208 is threaded in and out on the brush-tube, the key 205 will slide in the key-way and advance or retract the brush 203. As shown in Fig. 32, the contact terminals of the brushes 203 are supported and guided by slots 209 formed in a second insulating-strip 210 (which I call a "guiding comb" as it corresponds in function to that type of member) mounted in the casting 195, the slots being vertical and a separate slot being provided for each brush. By this construction, the point of each brush is supported at a point very close to the contact terminal which bears against the contact-roller 148, and at the same time each brush is free to move vertically within its slot, so that the resiliency of the brushes may act to hold their terminals always in contact with the contact-roller. Referring again to Figs. 15 and 16, it will be seen that the contact-roller is corrugated or grooved, the corrugations being of approximately the same depth as the radius of the brushes, so that each brush wire rides within a separate groove and contacts with the bottom and sides thereof. The rear face of the strip 210 is provided with a rubber tube, indicated at 210', which prevents the brushes from being readily sprung out of their slots. Back of this tube is shown the edge 211 of a sheet metal shield 212 (see Fig. 5) which lies between the end castings 53, 54 and back of the winding or feed-roll 55.

Referring again to Fig. 5, it will be seen that the music-sheet or strip 213 is designed to pass from the music-roll 123 downwardly and behind the contact-roller 148 and between the same and the brushes 203, and thence to the winding or feed-roll 55, and as each perforation of the music-strip or sheet passes under the brush terminal 203, the resiliency of the brush will cause it to pass through the perforation and to form metallic contact with the corrugated surface of the roller 148.

The frame 195 which carries the brushes 203 has at one end an arm 214, which extends beyond the pivot-bolt 215 and is then turned outwardly to extend through the cored aperture 216 of the casting 54. (See Figs. 3 and 4). To this arm is bolted (see Figs. 3, 4 and 11) the forwardly-extending arm 217 which lies parallel to the outer face of the end-casting 54, and the front extremity of the arm has an eye 218 in which is hooked a coil-spring 219, the lower end of which is fastened in an eye 220 carried by the casing-member 77 which houses the worm and worm-wheel. An adjustable stop-screw 217' is mounted above the arm 217 to limit its lift. The coil-spring 219 is a tension-spring and exerts a force tending to rock the arms 217 and 214 downwardly about the pivot 215 and thus to swing the brush-carrying frame 195 outwardly to a position shown in dotted lines in Fig. 32. In order to hold the brush-carrying frame in its normal or full-line position, as shown in Fig. 32, the arm 217 is provided with a pivoted foot 221 (see Figs. 3, 4, 25 and 19), the foot 221 being carried by a pivot-screw 222 and having its lower end notched, as shown at 223. The recess 223 is adapted to engage over a stud 224 secured in and projecting outwardly from the outer face of the end-casting 54, the foot 221 being normally held in engagement with the stud 224 by a light spring 225 which is stretched between a lug 226 formed on the foot 221 and an eye 227 carried on the arm 217, as shown in Fig. 4.

Referring again to Fig. 4, it will be seen that the outer end of the stud 224 is reduced to form a journal for a bell-crank trip lever 228, as shown in Fig. 26. This trip lever is adapted to be journaled upon the outer end of the stud 224, being secured in place thereon by a cotter 229' passing through an aperture in the stud, and has an inwardly-extending arm 230, which lies in front of the foot 221. The trip 228 is normally held out of contact with the foot 221 by a spring 231 extending between an eye 232 formed in the trip and an eye 233 carried by a stud 234, which is secured in the outer face of the end-casting 54, all as shown in Fig. 4. The lower end of the trip 228 is provided with a toe 229, which, when suitably actuated, as will later appear, causes the trip to swing in a clockwise direction against the force of the spring 231, whereby the arm 230 of the trip, shown in Fig. 27, bears against the foot 221 and pushes the same to the right, as viewed from Fig. 4, thereby releasing the recessed end 223 of the foot from its engagement with the stud 224 and permitting the coil-spring 219 attached to the arm 217 to draw this arm downwardly, whereby the brush-carrying frame 195 may be caused to swing outwardly from the position shown in full lines to the position shown in dotted lines in Fig. 32. In order that the foot 221 may be manually operated, I prefer to provide the same with an upwardly-extending handle 221' which the operator may grasp when he wishes to release the foot from its engagement with the stud.

In front of the pivot-stud 222 on which the foot 221 is pivoted, the arm 217 is provided with a depending portion 235 on the lower end of which is pivoted, as by a stud 236, a second foot 237 (see Fig. 2), the lower end of which is curved rearwardly to lie in the path of the compound dog 87 (see Figs. 17, 18, 19 and 20). Intermediate its length, the foot 237 is provided with a cushioning and adjusting plunger 238 (see Fig. 28) which seats within a recess 238' in the foot and is urged outwardly by a spring. This cushioning-plunger is adapted to bear against the surface 239' of the end-casting 54 when the foot is operated, as will later appear.

Extending rearwardly from the arm 214 is a bar 239 which, in the position of the parts shown in dotted lines in Fig. 32 and in full lines in Fig. 4, is adapted to bear against a spring-contact-plunger 240 mounted in a sleeve 241 which is bolted to, but insulated from, the end-casting 54. In the normal or operative position of the parts, as shown in Fig. 3, the bar 239 does not contact with the plunger 240. The details of construction of the contact-plunger 240 will be apparent from Fig. 31 of the drawings, from which it is seen that the plunger carries a stud 242 around which is coiled a compression-spring 243 mounted within the bore of the barrel 241 and provided on its projecting end with a nut and lock-nut 244 by which the expansion of the spring may be limited and adjusted.

Journaled on a stud 245 which projects from and is secured in the inner face of the end-casting 54, is a bell-crank lever 246. The forwardly-extending arm 247 of this lever is bifurcated and carries between its forked ends a roller 248, which bears upon the music-sheet or strip, as the same is wound upon the feed-roller 55. The rearwardly-extending arm 249 of the bell crank 246 carries at its outer extremity a pivot-stud 250 on which is mounted a contact-finger 251 which is normally held in line with the arm 249 by a spring 252, all as shown in Fig. 5. The roller 248 is held against the surface of the feed-roller 55 by a tension-spring 253. A bracket 254 bolted to the base-plate 51 of the machine carries at its upper end an adjustable trip plate 255, the adjustment being provided by slots 256, through which pass securing-screws 257 (see Figs. 5 and 28ª). The front edge 258 of the plate 255 forms the trip for the spring-finger 251 as the latter moves downwardly from the position shown in dotted lines to the position shown in full lines in Fig. 5, and the plate 255 is designed to be adjusted so that the finger 251 which is caught by the edge 258 of the plate as the arm moves downwardly will be released and permitted to snap into the position shown in full lines in Fig. 5 at the moment when, in the course of re-winding the music-roll, the music-sheet has been stripped or unwound wholly from the fed-roll 55, that is, when the parts are in the position shown in full lines in Fig. 5. It will be seen that the greatest accuracy is necessary in the operation of the finger 251 if this result is to be accomplished, since the thickness of the music-sheet is so small that a considerable length of the sheet when wound upon the feed-roll 55 will affect only in the minutest degree the position of the roller 248. As will later appear, it is the function of the finger 251 to control the operation of the re-wind mechanism so that the machine may be reversed and caused to play again when the roll has been completely re-wound. To this end, the bracket 254 carries an insulated contact-screw 259 with which the spring-finger 251 contacts when it is permitted to snap past the adjusting-plate 255.

*Mechanical operation.*

Before considering the electrical connections of the machine and the manner in which they are caused to accomplish the automatic operation of the same, it might be well to review briefly the operation of the mechanical parts of the machine which have been described.

In order to insert a music-roll in the machine, the handle 221' which is attached to the brush-carrying frame of the machine, will first be tilted forwardly from the position shown in Fig. 3 to the position shown in Fig. 4. This will cause the lower recessed end 223 of the supporting-foot 221 to be released from its engagement with the stud 224, thereby permitting the brush-carrying frame to be tilted by the coil-spring 219 into the position shown in dotted lines in Fig. 32. The brushes 203 will thus be withdrawn from the rear face of the contact-roll 148. Assuming that the contact-roll is in position and that the brush-carrying frame has been withdrawn so that the brushes are out of contact with the roll 148, a music-roll will be inserted in its position in the frame. This is accomplished by first bringing the right-hand end of the roll, as viewed from Fig. 1, into engagement with the driving and supporting-spindle 105 (see Fig. 9). When this engagement has been effected, the roll being maintained at a slight angle at this time, the left-hand end of the roll will be pushed backward in the frame, entering the slot or recess 147 in the frame (see Fig. 10), the pintle 129 of the left-hand end of the music-roll entering through the recess 147 in the frame (see Fig. 10), and as it moves backwardly the flange of the music roll pushes outwardly the hinged plate 132 against the tension of the spring which holds the latter in position. When the pintle 129 has been moved inward to its proper position, it will rest upon the bearing-rolls 130 (see Fig. 12) and its end will be held in proper adjusted position by the thrust-bearing screw 142. The roll is now in proper position in its journals. The free end of the music-sheet on the roll is then passed from the back of the roll downwardly and behind the contact-roll 148 (see Fig. 5) and around the feed or take up roll 55, in the manner shown in Fig. 5, the end of the music-sheet which is provided with an eyelet 60 (see Fig. 29) being snapped over the fastening-stud 58 in the feed-roll 55. As best seen from Fig. 5, the face of the feed-roll is cut away at the point at which the stud 58 is secured so that the outer end of the stud lies flush with the cylindrical surface of the roll.

The machine having thus been prepared for operation, the electric circuit controlling the motor 70 is closed and the latter caused to operate in what will be called the "playing" direction. Through its operation the motor will drive the worm-wheel gear-train 82 to cause the rotation of the worm-wheel shaft 84 in the direction shown by the arrow in Fig. 17. In its rotation the worm-wheel shaft 84 will carry with it the compound dog 87, which, we will assume, has its pivoted member 92 in the tilted position shown in Fig. 17. In this position of the dog-member 92 the driving-stud 95 thereof will contact with the crank-pin 69 on the crank 68, which is pinned to the winding or feed-roll shaft 62 (see Figs. 17 and 18). Through the connections above described, therefore, the worm-wheel shaft 84, revolving in the direction indicated by the arrow in Fig. 17, will continuously drive the feed-roll shaft 62, and the latter will, in turn, drive the feed-roll 55 in the direction shown by the arrow in Fig. 5, causing the music-sheet 213 to be fed from the music-roll 123 onto the feed-roll 255. Referring again to Fig. 17, it will be seen that on its first revolution in the direction indicated by the arrow, the toe 93 of the compound-dog-member 92 will contact with the point of the foot 237, which at that time lies in the position shown in dotted lines in Fig. 17. The upward movement of the toe 93 will therefore lift the foot 237 from the position shown in dotted lines to the position shown in full lines in Fig. 17, whereby the arm 217, which is secured to the brush-carrying frame 195, will be raised from the position shown in Fig. 4 to the position shown in Fig. 3, at which point the recessed end 223 of the supporting-foot 221 will snap over the stud 224, thereby permanently supporting the brush-carrying frame in its operative position, as shown in the full lines in Fig. 32. Passing from under the elevated end of the foot 237, the toe 93 will next contact with the end 229 of the trip 228, but when revolving, as shown in Fig. 17, no result is accomplished by this contact, the trip being simply oscillated in a counterclockwise direction, as viewed in Fig. 17, until the dog-point 93 clears the trip-point 229, the trip then returning to its normal position under the force of the spring 231. In the continuous forward or "playing" operation of the machine, therefore, these parts will maintain the positions shown in Fig. 17.

Referring again to Fig. 32, it will be seen that the music-sheets 213 is suitably perforated in the manner well understood in the art and that as each perforation passes under the contact-brush, the brush will be permitted to make a metallic contact with the corrugated surface of the roller, and if suitable electrical circuits are employed, the making and breaking of the contacts of the various brushes, as controlled by the positions of the perforations in the music-sheet, may be made to operate the playing instrumentalities of a musical instrument, such as a piano or a violin. In addition to its function as a contact-member, the roll 148 has a further and additional function, *i. e.*, to operate the governor mechanism of the machine. Thus, it is quite obvious that if the perforations in the music-sheet were equally spaced along the length of the sheet and the feed-roll 55 were driven at a constant speed, the linear velocity of the music-sheet and consequently the speed at which the musical instrument controlled by this machine is operated, would continuously increase as more and more of the music-sheet was wound upon the feeding-roll 55. It is therefore necessary to provide an additional means by which the linear velocity of the music-sheet may be regulated. The contact-roll 148 accomplishes this purpose in my machine in the following manner:

Referring to Figs. 29 and 30, it will be seen that when the machine is operating in the playing direction, as indicated by the arrow in Fig. 30, the roller-clutch mechanism will be engaged so that the clutch-ring 109 is driven continuously in the direction indicated by the arrow. The movement of the clutch-ring is resisted by the frictional brake-shoes 113, and through the driving-connections at the end of the shaft 105 (see Fig. 29) the unwinding of the music-roll 123 is therefore retarded so that the music-sheet 213 is under considerable tension between the music-roll and the feed-roll. This tension of the music-sheet serves to maintain it tightly in contact with the contact-roller 148, and the movement of the music-sheet therefore continuously drives the contact-roller in the direction indicated by the arrow in Fig. 32.

Referring now to Fig. 15, it will be seen that the contact roller 148 in its rotation will drive the shaft 150, and through the bevel gears 168, 169 will drive the vertical governor-shaft 170 on which the wabble governor 175 (see Fig. 6) is mounted. As the shaft 170 revolves, the action of centrifugal force will cause the wabble governor to tend to assume a horizontal position, as is well understood, and through the link connection 177 the sliding collar 176 will thus be lifted away from the contact-brush 178 which is carried by the upper end of the pendulum 180. By this mechanical means, therefore, I am enabled to control the making and breaking of an electric circuit which may be established between the contact-brush 178 and the frame of the machine through the sliding collar 176. The governor screw 188 (see Fig. 6) may be threaded inward or outward, thus varying the elevation of the arm 182 on which the pendulum 180 is mounted, and by the governor-screw, therefore, I can determine the speed at which the governor shaft is to be rotated before the sliding collar 176 will lift away from the contact-brush 178. The position of the governor screw which, as I have described, determines the speed of the machine is visibly indicated by the indicating pointer 192 (see Figs. 13 and 14), the rear end 194 of the indicating pointer being held by gravity in contact with the lower face of the sliding collar 176. The governor mechanism, as described above, will therefore be operated in accordance with the linear velocity of the music-sheet, and, it being assumed that suitable electrical connections are provided, the driving-motor 70 may be so regulated as to maintain a constant linear velocity of the music-sheet. The operation of the mechanism, as so far described, therefore, may, if suitable electrical connections are provided, result in a proper feeding and controlling of the music-sheet and a consequent operation, through the contact-brushes 203, of the musical instrument.

Referring again to Fig. 5, it will be noted that as the music sheet becomes wound upon the feed-roll 55, the diameter of the latter will be increased and the roll 248 mounted in the arm 247 will be pushed downwardly, thus raising the connected arm 249 and lifting the spring-finger 251 into the position shown in dotted lines in this figure. If suitable electrical connections be provided in connection with the contact-screw 259, these connections may therefore be made responsive to the position of the roller 248, or, in other words, the connections may be established when the feed-roll carries only one or two layers of the music-sheet, and may be broken when in the operation of the machine the feed-roll has wound upon itself a considerable thickness of music sheet. We will assume, therefore, that some considerable time before the whole of the music-sheet has been wound upon the feed-roll, the spring-finger 251 has been lifted out of contact with the screw 259. In the continued winding or feeding of the music-sheet, the latter will be eventually wholly unwound from the music-roll 123. In perforating a music-roll for use in my machine I prefer to provide a short unperforated length at the end of the roll so that after all of the effective or perforated portion of the sheet has passed under the contact-brushes 203, there will remain a few turns of unperforated sheet upon the music-roll. If, now, an additional brush 203 be provided, unconnected with the musical instrument, it will be possible to perforate the music-sheet beyond the effective or "playing" perforated portion thereof in such a manner that this additional brush will register with the single perforation and through it make contact with the roll 148 at a time when the whole of the active or effective portion of the sheet has been wound upon the feed-roller 55. If the roll be so perforated, and such an additional brush provided, it will therefore be possible to control an additional electric circuit in such a manner as to cause the automatic reversal of the driving-motor 70 when the effective or playing portion of a music-sheet has been wholly unwound from the music-roll.

Assuming, therefore, that by some suitable electrical means I have accomplished this automatic reversal of the driving-motor 70, the mechanical elements of my machine will now function as follows: Referring again to Fig. 17, it will be assumed that the shaft 84 has been caused to cease revolving in the clockwise direction indicated by the arrow in this figure and has started to revolve in a counterclockwise direction. In this direction of rotation, the driving-lug 95 on the compound dog-member 92 will draw away from the crank-pin 69 of the crank 68, leaving the latter in the position in which it is shown in Fig. 17. As the compound-dog 87 now revolves in a counter-clockwise direction, as indicated in Fig. 19, the toe 93 of the dog-member 92 will come into contact with the trip-point 229. The continued counter-clockwise movement of the shaft will cause the dog-member 92 to swing on its pivot 91, whereby the lugs 95, 96 are raised from the position shown in Fig. 19 to the position shown in Fig. 20. When they have reached the latter position, the dog-member 92 will have come to the end of its permissible tilting motion, and the toe 93 will drive the trip-point 229 to the left, as viewed in Fig. 20, whereby the upper arm 220 of the trip (see Fig. 27) will act against the supporting foot 221 to force the latter to the right, as viewed in Fig. 20, and out of contact with the supporting-stud 224. The coil-spring 219 will thereupon tilt the brush-carrying frame into the position shown in dotted lines in Fig. 32, so that the brushes are withdrawn from the music-sheet. Continued counter-clockwise rotation of the shaft 84 will next bring the driving-stud 96 of the dog-member 92 against the driving crank-pin 99 which is secured in the rewind gear 86. At this point it may be noted that the spring-pressed plug 97 (see Fig. 18) exerts such pressure against the pivoted dog-member 92 that the latter is frictionally held from tilting by gravity, that is, it must be positively moved to each position, and when in one position it will not change that position except under the action of a sufficient force. The dog-member 92, therefore, having been tilted into the position shown in Fig. 20 by its contact with the trip 229, will continue to maintain this tilted position, in which the lug 96 has been thrown outwardly into the path of the driving-pin 99 on the re-wind gear 86.

Referring again to Figs. 3 and 4, it will be seen that as the arm 239 which is attached to the brush-carrying frame moves from the position shown in Fig. 3 to the position shown in Fig. 4, it will come into contact with the spring contact-plunger 240, and if suitable electrical connections are provided, this contact may be made to accelerate the driving-motor 70 so that when operating in the re-wind direction it will be driven at a speed considerably greater than the speed at which it operated in the playing direction, and it will be readily understood that this is desirable since the time spent in re-winding the music-sheet upon the music-roll is non-productive time from the standpoint of the user of the machine.

Continued rotation in a counter-clockwise direction of the shaft 84 will operate in the manner described to continuously drive the re-wind gear 86, and through the latter and through the gear-train 100, 104 the music-roll will be driven in a counter-clockwise direction, as viewed from Fig. 5, to re-wind upon itself the music-sheet. At this point it may be noted that in the re-winding operation the roller-clutch 108 automatically releases so that the brake 113 does not retard the re-winding operation. The frictional resistance to rotation of the feed-roll is by means of the spring pressed plunger 260 sufficient to keep the music-sheet under a slight tension during the re-winding operation and thereby to insure the compact and proper re-winding of the same.

As the re-winding operation continues, the effective diameter of the feed-roll 55 becomes smaller, and when the music-sheet has been almost wholly stripped from the latter, the roller 248 will be moved inwardly to a sufficient distance to permit the spring-held contact-finger 251 to snap past the edge 258 of the plate 255, thereby establishing a contact with the screw 259 (see Figs. 5 and 28ª). As was explained in connection with the mechanical construction of these parts, it is essential that a very nice adjustment of this operation be made in order that the establishment of the contact with the screw 259 may be at the exact time when the perforated portion of the music-sheet has been entirely re-wound upon the music-roll. Suitable electrical connections having been provided, the contact action of the spring-finger 251 may be made to automatically reverse the driving-motor 70 at the exact moment that the perforated portion of the music-sheet has been wholly re-wound, but before the short unperforated end of the same has been stripped from the feed-roller 55. Assuming, therefore, that such automatic reversal of the driving-motor 70 has been effected, the shaft 84 will cease the revolve in the counter-clockwise direction and will begin to move in a clockwise direction. In this movement, the driving-pin or lug 96 of the driving-dog 92 will withdraw itself from contact with the pin 99 in the re-wind gear 86, and, as the compound dog moves in a clockwise direction, the toe 93 thereof will come into contact with the end of the foot 237. Continued clockwise movement of the shaft 84 will cause the dog-member 92 to swing on its pivot 91 from the position shown in Fig. 20 to the position shown in Fig. 17. In this movement, the left-hand end of the dog-member 92, as seen in Fig. 20, will be tilted downwardly and inwardly so that the lug 96 of the dog member is no longer in the path of the crank-pin 99 of the re-wind gear 86. Further continued clockwise rotation of the shaft 84 will cause the toe 93 of the dog-member 92 to lift the supporting foot 237, whereby the arm 217 is raised from the position shown in Fig. 4 to the position shown in Fig. 3, and the brushes 203 are again brought into contact with the music-sheet. When the foot 237 has been lifted to this position, the supporting foot 221 will snap over the stud 224 to maintain the brush-frame in the proper position, and the toe 93 will then pass from under the foot 237. Further rotation of the shaft 84 will bring the driving-lug 96 into contact with the face of the driving-crank-pin 69, thereby driving the feed-roll 55 in the playing direction.

Assuming that the electrical connections which I have mentioned above have been provided, the mechanical operation of my machine may thereafter be briefly traced as follows: The music-roll having been properly inserted and the motor started, the brush-carrying frame will be caused to automatically approach the contact-roll and to hold the contact-brushes in operative position with relation thereto during the entire playing movement of the machine, and the music-sheet will then be fed over the contact-roll and wound upon the feeding-roll 55. When the effective or perforated portion of the sheet has been entirely stripped from the music-roll, the driving motor will be caused to automatically reverse, the brush-frame will be tilted backwardly so that the brushes are no longer in contact with the music-sheet, the re-wind gear will then be set in operation, the motor-speed accelerated and the music-sheet re-wound upon the music-roll at the maximum permissible rate. When the whole of the perforated portion of the sheet has been re-wound upon the roll, the motor will again automatically reverse. The re-wind gear will be released, and the brush-carrying frame will approach the music-sheet and bring the brushes into proper relation thereto, and the feed-roll driving-shaft will then be engaged and again driven in the playing direction. This sequence of operations will be continued as long as the power is supplied to the driving motor, and without the attention of any operator. The mechanical elements I have described, when connected with suitable electrical controlling means, will therefore operate and function wholly automatically in such a manner that a musical instrument connected with my governing and controlling machine may be continuously operated without any attention.

*Electrical connections.*

Suitable electrical connections for operating my machine in the manner I have described are shown diagrammatically in Fig. 40. Referring to this figure, numerals 300 and 301 indicate, respectively, two line-wires of a city lighting circuit, or any other suitable constant potential circuit. The line-wire 301 is, in practice, grounded to the frame of my machine. In the diagram I have illustrated it as being connected electrically by conductors, first with the contact-roll 148 and then, by branches, with the arm 239, the governor collar 176 and the spring contact-finger 251. All of these parts, it will be noted, are formed mechanically as parts of, or in electrical connection with, the frame of the machine. The line-wire 301 is further connected with a tap 302 of a resistance-coil 303. It will be noted that there are several taps 302 formed on the coil so that by shifting the connections from one tap to another, various portions of the coil may be cut out and its resistance thereby varied. The line-wire 300 is connected to a stem 304, on which is mounted a solenoid core 305, which passes through solenoid-coils 306 and 307. The projecting end of the stem 304 carries, and is electrically connected to, a switch-bar 308, which has a fiber insulation block 309 let into its upper portion. Centrally mounted in the insulating block 309 is a contact-disk 310 having an upstanding terminal 311. The mechanical construction of the parts above described will be seen from Figs. 35 to 38, in which is shown a base-plate 312 carrying the solenoids 306 and 307 and bearings 313' and 314 for the front and rear ends, respectively, of the stem 304. An intermediate bearing 314' may be used to support and guide the center of the same. The base-plate also carries brush-supports 315 and 316 mounted, respectively, on the two sides of the bar 308. The brush-support 315 carries independent brushes 317, 318, while the brush-support 316 carries brushes 319, 320. The upstanding vertical connector 311 for the contact-disk 310 moves in a slot 321 formed in a bracket-arm 322, which is mounted on the base 312. A short length of wire 323 forms a connection between the bracket-arm and the connector 311. Suitable binding-posts 325 are mounted in the base and connected with the solenoid terminals and the bracket 322. An operating handle 326 may be fastened to one end of the stem 304, and the throw of the stem may be limited by cushioning-washers 327 which abut against the bearings 313' and 314. As shown in Fig. 38, brushes of conventional construction, consisting of spring-pressed contact-members 328 are mounted in hollow bushings 329.

Returning to the consideration of the electrical connections, as shown in the diagram (Fig. 40) it will be seen that these connections are determined by the position of the switch-bar 308. When this bar is in the position shown in the diagram, the current will flow in through the line-wire 300, through the stem 304, to the switch-bar 308, and will there divide, passing out of the brush 318, through the field-coils 330 of the motor 70, back through the wire 331, to the brush 319, to the disk 310, and by means of the connector 311 and wire 323, to the wire 332 in series with the armature 333, thence through the armature to a point 334 at which the current again divides, a portion passing through the adjustable resistance 303 and thence to the ground-wire 301, and another portion passing upwardly through the shunt 335 to a binding post 181 on the insulated pendulum 180, thence through the contact-brush 178 to the governor collar 176 which is connected to the return wire 301. Returning now to the switch-bar 308, it will be seen that the brush 320 is also in contact with the switch-bar in this position of the parts, current flowing out through this brush by means of the wire 336 through the solenoid 307, thence outwardly by the wire 337 to the additional brush 338. Since this brush, however, is held from contact with the roller 148 by the music-sheet, the circuit last described will not be effective during normal operation of the machine. In such normal operation, the parts being in the position shown, there will be a constant adjusted flow of current through the motor 70 and through the resistance 303. This resistance is preferably so adjusted that the amount of current taking this path is just sufficient to keep the motor 70 in operation at its lowest speed. The remainder of the current for actuating the motor flows through the shunt or governor-circuit 335. This is practically a short-circuit, and when the governor collar 176 rests upon the brush 178 the motor will operate at maximum speed. The governor-screw 185 will be so adjusted, however, that when the machine has attained the desired playing speed, the governor collar 176 will be lifted from contact with the brush 178, and this shunt circuit interrupted. As soon as the motor falls below this adjusted speed, however, the collar will again come in contact with the brush. In actual practice, this governing action through the shunt circuit 335 is substantially a continuous action, the variations in motor speed being too slight to be noticeable. The electrical connections, as described above, will therefore cause the machine to operate constantly at the predetermined speed in the "playing" direction, until the music-sheet has been wholly wound upon the feed-roll 55. It should be noted in this connection that the spring contact finger 251, which is shown in Fig. 40, will have been raised out of contact with the screw 259 some considerable time before the music-roll has been wholly unwound. As soon as the "playing" or perforated portion of the music-sheet has passed over the contact-roll 148, a portion of the sheet having a perforation adapted to register with the additional contact-brush 338 will pass over the roll. At this instant the contact-brush 338 will pass through the perforation and immediately establish a current by means of the brush 320 through the shunt-wire 337 and the solenoid 307, thus energizing the latter and causing the core 305 to be sucked out of the solenoid 306 and into the solenoid 307. This will shift the switch-bar 308 downwardly, as viewed in the diagram (Fig. 40) until the brush 318 bears upon the right-hand face of the contact-disk 310, while the brush 320 will now rest on the insulation block 309. The path of the current will then be through the switch-bar 308 into the brush 319 through the wire 331 and the field-coils 330 of the motor, back to the brush 318 and thence to the contact-disk 310 and wires 323 and 332 through the motor armature 333, and thence return in the manner described. It will be seen that this shifting of the switch-bar by the solenoid has reversed the connections of the motor field-coils, causing the current to flow through them in a direction opposite to that in which it was previously flowing, but without affecting the direction of flow of current through the armature-coil. The result of this reversal of the field-coils is that the motor reverses its direction of rotation, and, as a first result of such reversal, shifts the brush-carrying frame away from the contact-roller and thereby causes the arm 239 to move into contact with the spring contact-plunger 240, whereby the governor-circuit 335 and the resistance-circuit 303 are both short-circuited and the current flowing from the motor-armature may pass directly through the return wire 339. This short-circuiting of the resistance-coil and governor causes the motor to accelerate to its maximum speed and turn in the re-winding direction at such accelerated speed.

Returning now to the switch-bar in its re-winding position, it will be seen that the current may also flow from the switch-bar 308 out through the brush 317 and wire 340 to the solenoid 306, out of the latter and through the wire 341 to the contact-post 259. This circuit will be open, however, as long as the spring-finger 251 remains out of contact with the post 259. This mechanical condition of affairs will continue, as was described in considering the mechanical operation of the machine, until the music-sheet has been wholly re-wound upon the music-roll. At that instant, the contact-finger 251 will snap past the edge 258 and establish the solenoid-circuit 306, which has just been described. The solenoid circuit 307 having opened by the shifting of the brush-carrying bar away from the contact-roll during the first part of the re-winding movement, the solenoid 307 has remained dead during the whole of the re-winding operation. The instant, therefore, that the solenoid 306 is energized by the spring-finger 251, the core 305 is sucked into the solenoid 306, which causes the switch-bar to be drawn back to the position shown in Fig. 40, that is, to the "playing" position. The motor will thereupon automatically reverse, and the parts will function in the manner described to operate the machine in the playing direction until the music-sheet has again been unwound and the reversing perforation thereof has passed under the additional brush 338.

By the combination between the mechanically-operating parts of my machine and the electrical connections thereof I am thus able to cause the machine to operate in a wholly automatic manner as long as it is supplied with power, and in such operation a music-sheet will be unwound from a music-roll and pass through the machine for the purpose of controlling the operation of a musical instrument, and when the effective portion of the sheet has been unwound, the mechanism will automatically reverse, the controlling brushes of the musical instrument will be moved to an inoperative position, the music-sheet will be re-wound upon the muisc-roll, and when wholly re-wound the mechanism will again reverse and the brushes return to their normal position and the music-sheet be again fed through the machine to cause the operation of the musical instrument, all of these operations being performed in the sequence given in an entirely automatic manner and without any attention or care of the operator.

For the purpose of making clear my invention, I have, in the foregoing specification and in the drawings which accompany the same, described and illustrated in considerable detail a form of machine which embodies the invention. It is to be understood, however, that I do not regard my invention as limited to these features of construction as illustrated and described, except in so far as I have included such limitations within the terms of the following claims, it being my intention to claim as my invention the means for accomplishing the results at which I aim in the broadest possible manner permitted by the prior art. I wish it to be understood also, that while in describing, illustrating and claiming an embodiment of my invention, I constantly refer to the use of the machine in combination with a mechanically-operated musical instrument, I do not regard this art as being the only one for which my machine is adapted. In duplicating machinery of various types, electric signs, and numerous other arts, a record-strip or sheet, either perforated or carrying contact devices, is made use of to actuate or control the actuation of a machine. In all of these arts my invention is adaptable for use, and in the accompanying claims the terms "music-sheet," "music-roll," "player mechanism," and the like are to be regarded merely as identification words and not definitive limitations of the uses of my machine.

What I claim as new and desire to secure by Letters Patent is—

1. In a machine of the class described, a music-roll, a feed-roll mounted to withdraw a music-sheet from the music-roll, means for operating said feed-roll in a playing direction, means for governing the speed of said operating means operated by the music-sheet, means for automatically releasing the feed-roll when the music-sheet has been entirely stripped from the music-roll, means for automatically re-winding the music-roll after the feed-roll has been released, means for automatically releasing the music-roll when the music-sheet has been re-wound, and means for automatically engaging and again driving the feed-roll, the said automatically-operating means being timed to function in the order given and for the purpose set forth.

2. In a machine of the class described, a music-roll having a music-sheet wound thereon, a take up adapted to strip the music-sheet from the music-roll, a reversible driving-motor, means for governing the speed of said motor when the music-sheet is being fed in a playing direction operated by the music-sheet, and driving connections between said motor and said feed-roll and music-roll, said connections being adapted to drive the feed-roll in a playing direction when the motor is operating in one direction to release the feed-roll and engage and drive the music-roll in a re-winding direction when the motor is operated in the opposite direction and to release the music-roll and to drive the feed-roll in a playing direction when the motor is again reversed, the said driving connections being timed to function in the order given above and for the purpose set forth.

3. In a machine of the class described, a music-roll, having a music-sheet wound thereon, a feed-roll adapted to strip the music-sheet from the music roll, a reversible electric motor having driving connections with said feed-roll, means for governing the speed of said motor operated by the music-sheet, electrically operated means for reversing the said motor, and a circuit-controller operable from the music-sheet and acting to energize and deënergize said reversing means.

4. In a machine of the class described, a music-roll having a music-sheet wound thereon, a feed-roll adapted to strip the music-sheet from the music-roll, a reversible electric driving-motor, driving connections between said motor and said music-roll and feed-roll, means for governing the speed of said motor operated by the music-sheet, means operable from said music-sheet for reversing the direction of rotation of said motor, said driving connections being adapted to drive the feed-roll in a playing direction when the motor is operating in one direction and to release the feed-roll and drive the music-roll in a rewinding direction when the motor is operated in the opposite direction.

5. In a machine of the class described, a music-roll having a music sheet wound thereon, a feed-roll adapted to strip the music-sheet from the music-roll, a reversible electric driving-motor, driving connections between said motor and said music-roll and feed-roll, means operable by said music-sheet for controlling the direction of rotation of the motor, an electric circuit controlling the speed of said motor, and automatically-operating control means for said circuit, said means functioning to accelerate the motor when the latter is operating in a re-winding direction.

6. In a machine of the class described, a music-roll having a music-sheet wound thereon, a feed-roll adapted to strip the music-sheet from the music-roll, a reversible electric driving-motor, electrical circuits for controlling the speed and direction of rotation of the said driving-motor, and means operated from said music-sheet for controlling said electrical circuits.

7. In a machine of the class described, a music-roll having a music-sheet wound thereon, a feed-roll adapted to strip the music-sheet from the music-roll, a reversible electric driving-motor, driving connections between said motor and said feed-roll and music-roll, means for governing the speed of said motor operated by the travel of the music-sheet, an electrical circuit controlling the direction of rotation of said motor, means operable from said music-sheet for controlling the said electrical circuit whereby the motor operates in a playing direction until the music-sheet has been stripped from the music-roll and is then automatically reversed to operate in a re-winding direction until the music-sheet has been entirely re-wound upon the music-roll.

8. In a machine of the class described, a music-roll having a music-sheet wound thereon, a feed-roll adapted to strip the music-sheet from the music-roll, movable note selecting mechanism adapted to be operated by contact with said music-sheet, a driving-motor, means for governing the speed of said motor operated by the music-sheet, driving connections between said motor and the music-roll, feed-roll, and note selecting mechanism, said driving connections operating to feed said music-sheet in a playing direction and to maintain said note selecting mechanism in contact with the sheet during the feeding-motion, and to re-wind said music-sheet upon the music-roll and to maintain the note selecting mechanism out of contact with the music-roll during the re-winding operation.

9. In a machine of the class described, a music-roll having a music-sheet wound thereon, a feed-roll adapted to strip the music-sheet from the music-roll, note selecting mechanism, a reversible electric driving-motor, means for governing the speed of said motor operated by the music-sheet, means operable from said music-sheet for controlling the direction of rotation of said driving-motor, and driving connections between said motor and said music-roll, feed-roll and note selecting mechanism, said driving connections being adapted to rotate the feed-roll in a playing direction and to hold the note selecting mechanism in engagement with the music-sheet when the motor is operated in one direction and to re-wind the music-sheet upon the music-roll and to maintain the note selecting mechanism out of contact with the music-sheet when the motor is operated in the opposite direction.

10. In a machine of the class described, a music-roll having a music-sheet wound thereon, a feed-roll adapted to strip the music-sheet from the music-roll, note selecting mechanism, a reversible driving motor, means for governing the speed of said motor operated by the music-sheet, means operable by said music-sheet to control the direction of rotation of said motor, driving connections between said motor and the music-roll, feed-roll and player mechanism, said driving connections operating to drive said feed-roll in a playing direction and to maintain the note selecting mechanism in contact with the music-sheet when the motor is operating in one direction and to drive said music-roll and to maintain said note selecting mechanism out of contact with the music-sheet when the motor is operating in the opposite direction, and means for automatically accelerating said motor when it is operating in said last-named direction.

11. In a machine of the class described, a music-roll having a music-sheet wound thereon, a feed-roll adapted to strip the music-sheet from the music-roll, note selecting mechanism operable through contact with said music-sheet, a reversible electric driving-motor, means for governing the speed of said motor operated by the music-sheet, electric circuits controlling the speed and direction of rotation of the said motor, driving connections between said motor and the music-roll, the feed roll and the note selecting mechanism, means operable by said music-sheet for controlling said motor-reversing circuit, whereby the motor rotates in one direction until the music-sheet has been entirely unwound from the music-roll and is then automatically reversed, the said driving-connections operating to maintain the note selecting mechanism in contact with the music-sheet during the unwinding of the same and to withdraw the note selecting mechanism from the sheet when the motor is reversed, and means operated by the movement of said note selecting mechanism for controlling said motor speed governing-circuit.

12. In a machine of the class described, a music-roll having a music-sheet wound thereon, a feed-roll adapted to strip the music-sheet from the music-roll, note selecting mechanism adapted to be operated by contact with the music-sheet, means for driving the feed-roll in a playing direction, means to maintain the note selecting mechanism in contact with the music-sheet during such playing movement, means to release the feed-roll from its driving connections when the music-sheet has been wholly un-wound, means for shifting the note selecting mechanism out of contact with the music-sheet, means for engaging and driving the music-roll in a rewinding direction, means for releasing the music-roll from its driving connections when it is wholly re-wound, means for shifting the note selecting mechanism back into engagement with the music-sheet, and means for again driving the feed-roll in a playing direction, all of the above-named means operating automatically and in the sequence named, and means for controlling the speed of the music-sheet in the playing direction controlled by the lineal speed of the sheet.

13. In a machine of the class described, a music-roll having a music-sheet wound thereon, a feed-roll adapted to strip the music-sheet from the music-roll, note selecting mechanism adapted to be operated by contact with the music-sheet, means for driving said feed-roll in a playing direction, and means for maintaining said note selecting mechanism in contact with the music-sheet during such motion of the feed-roll, means for releasing the feed-roll from its driving connections when the music-sheet has been wholly stripped from the music-roll, means for shifting the note selecting mechanism out of contact with the music-sheet, means for engaging the music-roll and driving the same at an accelerated speed in a direction which will re-wind the music-sheet thereon, means for releasing the music-roll when the same has been wholly re-wound, means for shifting the note selecting mechanism back into engagement with the music-sheet, and means for again engaging the feed-roll and driving the same at a reduced speed in a playing direction, all of the above-named means operating automatically and in the sequence named, and means for controlling the speed of the music-sheet in the playing direction controlled by the lineal speed of the sheet.

14. In a machine of the class described, a music-roll having a music-sheet wound thereon, a feed-roll adapted to strip the music-sheet from the music-roll and to wind the same upon itself, note selecting mechanism mounted between the music-roll and the feed-roll and operable by contact with the intermediate portion of the music-sheet, a reversible driving-motor, driving connections between said motor and said feed-roll, adapted to rotate the latter to strip the music-sheet from the music-roll, means for automatically reversing the direction of rotation of the driving-motor when the music-sheet has been entirely wound upon the feed-roll, driving connections operable with the initial reversing movement of the driving-motor to shift the note selecting mechanism out of contact with the music-sheet, driving connections operable by a further reverse movement of the driving-motor to engage the music-roll and drive the same in a re-wind direction, means for again automatically reversing the driving-motor when the music-sheet has been wholly re-wound upon the music-roll, driving connections operable by this initial reverse movement of the motor to shift the note selecting mechanism back into contact with the music-sheet, and means operable by further reverse movement of the driving-motor to again engage the feed-roll and drive the same in a playing direction, all of the above-named means operating in the sequence given and for the purpose described.

15. In a machine of the class described, a music-roll having a music-sheet wound thereon, a feed-roll adapted to strip the music-sheet from the music-roll and to wind the same upon itself when operated in the playing direction, a reversible electric driving-motor, driving connections between said motor and said feed-roll adapted to drive the latter in a playing direction, an electrically - operated reversing switch for said electric motor, an electric switch controlling the actuation of said reversing switch, note selecting mechanism mounted between the music-roll and the feed-roll and operable by contact with the intermediate portion of the music-sheet, a circuit-controlling device mounted on said note selecting mechanism and controlling the actuating circuit for said motor-reversing switch, means carried by said music-sheet for operating said circuit-controlling device, and driving connections between said motor and said music-roll operable to drive the same in a re-winding direction when the direction of rotation of the motor has been reversed.

16. In a machine of the class described, a music-roll having a music-sheet wound thereon, a feed-roll adapted to strip the music-sheet from the music-roll and wind the same upon itself, note selecting mechanism mounted between the music-roll and the feed-roll and operable by contact with the intermediate portion of the music-sheet, a reversible electric driving-motor, speed-controlling and reversing circuits for said motor, said speed controlling circuit being controlled by the lineal speed of the music-sheet, means operable by the music-sheet for controlling said circuits, and driving connections between said motor and said music-roll and feed-roll, said driving connections operating to drive the feed-roll when the motor is rotating in one direction and to release the feed-roll and drive the music-roll when the motor is operating in the opposite direction.

17. In a machine of the class described, a music-roll having a music-sheet wound thereon, a feed-roll adapted to strip the music-sheet from the music-roll and to wind the same upon itself, note-selecting mechanism mounted between the music-roll and the feed-roll and operable by contact with the intermediate portion of the music-sheet, a reversible electric driving-motor, driving connections between said motor and said music-roll and feed-roll, speed-governing and reversing circuits for said motor, means operable by the music-sheet to control the speed-governing circuit and to maintain a constant linear velocity of the music-sheet when the motor is operating in a playing direction, and means operable by the music-sheet for controlling the reverse circuit, and means operable by initial reverse rotation of the motor to short-circuit said speed-governing means and accelerate the motor.

18. In a machine of the class described, a music-roll having a music-sheet wound thereon, a feed-roll adapted to strip the music-sheet from the music-roll and wind the same upon itself, note selecting mechanism mounted between the feed-roll and the music-roll and operable by contact with the intermediate portion of the music-sheet, a reversible driving-motor, driving connections between said motor and said feed-roll, said driving connections being releasable by reverse movement of the motor, means for shifting said note selecting mechanism out of contact with the music-sheet, driving connections for said shifting means operable by initial reverse movement of said motor, and driving connections for said music-roll, said connections being operable only by further reverse movement of the driving-motor.

19. In a machine of the class described, a music-roll having a music-sheet mounted thereon, a feed-roll adapted to strip the music-sheet from the music-roll and wind the same upon itself, a movable frame, note selecting mechanism mounted on said frame and adapted to engage a music-sheet between the music-roll and the feed-roll in one position of the frame, a reversible, driving-motor, driving connections between said motor and said feed-roll, and means operated by reverse movement of said driving connections to shift the said frame and move the note selecting mechanism out of contact with the music-sheet.

20. In a machine of the class described, a music-roll having a music-sheet wound thereon, a feed-roll adapted to strip the music-sheet from the music-roll, a reversible driving motor, a drive-shaft actuated by said motor, a crank mounted on said drive-shaft, an oscillating driving-dog pivoted on said crank, driving-lugs carried by said dog, a driving-lug connected with said feed-roll and engageable by a driving-lug of said dog in one position of the latter, and a driving-lug connected with said music-roll and adapted for engagement with a driving-lug on said dog in another position of the latter.

21. In a machine of the class described, a music-roll having a music-sheet wound thereon, a feed-roll adapted to strip the music-sheet from the music-roll, a reversible driving-motor, a drive-shaft operable by said motor, a crank mounted on said drive-shaft, an oscillating dog pivoted on said crank, driving-lugs carried by said dog, a driving-lug connected with said feed-roll and adapted for engagement with a driving-lug on said dog in one position of the latter, a driving-lug connected with said music-roll and adapted for engagement with a driving-lug on said dog in another position of the latter, and means operable by initial movement of said drive-shaft for shifting said oscillating-dog.

22. In a machine of the class described, a music-roll having a music-sheet wound thereon, a feed-roll adapted to strip the music-sheet from the music-roll, a reversible driving-motor, a drive-shaft operable by said motor, a crank mounted on said drive-shaft, an oscillating-dog pivoted on said crank, means for yieldably holding said dog in any oscillated position, driving-lugs carried by said dog, a driving-lug connected with said feed-roll and adapted for engagement with a driving-lug on said dog in one position of the latter, a driving-lug connected with said music-roll and adapted for engagement with a driving-lug on said dog in another position of the latter, and means operable by initial movement of said driving-shaft for oscillating said dog from one position to the other.

23. In a machine of the class described, a music-roll having a music-sheet wound thereon, a feed-roll adapted to strip the music-sheet from the music-roll, a reversible driving motor, a drive-shaft operable by said motor, a crank mounted on said drive-shaft, an oscillating dog pivoted on said crank, yieldable means for retaining said dog in any oscillated position, means to positively limit the oscillation of said dog, driving-lugs mounted on said dog, a driving-lug connected with said feed-roll and adapted for engagement with a driving-lug on said dog in one position of the latter, a driving-lug connected with said music-roll and adapted for engagement with a driving-lug on said dog in another position of the latter, and means operable by initial movement of said drive-shaft for oscillating said dog from one of the above-named positions to the other.

24. In a machine of the class described, a music-roll having a music-sheet wound thereon, a feed-roll adapted to strip the music-sheet from the music-roll, a reversible driving-motor, a drive-shaft operable by said motor, a crank mounted on said drive-shaft, an oscillating dog pivoted on said crank, projecting driving-lugs carried by opposite sides of said dog, driving means for said feed-roll mounted for axial rotation about said drive-shaft on one side of said dog, a driving-lug carried by said means and adapted for engagement with a driving-lug on said dog in one position of the latter, driving means for said music-roll mounted axially for rotation about said drive-shaft, on the opposite side of said dog, a driving lug carried by said last-named means, and adapted for engagement with the other driving-lug of said dog in the second position of the latter, and means operable by initial rotation of said drive-shaft for oscillating said dog from one of the above-named positions to the other.

25. In a machine of the class described, a music-roll having a music-sheet wound thereon, a feed-roll adapted to strip the music-sheet from the music-roll, a movable note selecting mechanism adapted to be brought into engagement with said music-sheet, a reversible driving-motor, a drive-shaft operable by said motor, a crank mounted on said drive-shaft, an oscillating dog pivoted on said crank, driving-lugs mounted on said dog, a driving-lug connected with said feed-roll and adapted for engagement with a driving-lug on said dog in one oscillated position of the latter, a driving-lug connected with said music-roll and adapted for engagement with said dog in another oscillated position of the latter, and a shifting means for said note selecting mechanism mounted in the path of said dog and adapted to move the latter from one oscillated position to another by engagement therewith and to be simultaneously operated to effect the shifting of said note selecting mechanism.

26. In a machine of the class described, a music-roll having a music-sheet wound thereon, a feed-roll adapted to strip the music-sheet from the music-roll, note selecting mechanism, mounted for movement toward and away from said music-sheet, a reversible-motor, a drive-shaft operable by said motor, a crank mounted on said drive-shaft, an oscillating dog pivoted on said crank, driving-lugs mounted on said dog, a driving-lug connected with said feed-roll and adapted for engagement with a driving-lug on said dog in one position of the latter, a driving-lug connected with said music-roll and adapted for engagement with a driving-lug on said dog in another position of the latter, a foot connected with said note selecting mechanism and adapted to shift the latter into engagement with the music-sheet, means for locking the note selecting mechanism in such position of engagement, and a trip for releasing said locking-means, said foot and said trip lying in the path of rotation of said dog and adapted to shift the latter from one oscillated position to another by contact therewith.

27. In a machine of the character described, a music-roll having a music-sheet wound thereon, a feed-roll adapted to strip the music-sheet from the music-roll, a swinging frame, note selecting mechanism carried by said frame and adapted to be swung into or out of engagement with said music-sheet intermediate the two rolls, an actuating foot secured to said frame, a reversible driving-motor, a drive-shaft operable by said motor, a crank mounted on said drive-shaft, an oscillating dog pivoted on said crank, yieldable means for holding said dog in any position of oscillation, driving-lugs carried by opposite faces of said dog, a crank co-axial with said drive-shaft and connected with said feed-roll, a driving-lug carried by said crank and adapted for engagement with a driving-lug on said dog in one oscillated position of the latter, a re-wind gear mounted co-axially with said drive-shaft, a driving-lug carried by said re-wind gear and adapted for engagement by a driving-lug on said dog in another oscillated position of the same, a toe formed on said dog and adapted for engagement with the foot of said frame to shift the latter and bring the note selecting mechanism into operative position, means for locking the note selecting mechanism in operating position, and a trip for releasing said locking means, said trip being mounted for engagement by the toe of said dog, substantially as and for the purpose specified.

28. In a machine of the class described, a roll on which a music-sheet may be wound, a reversible driving-motor for said roll and an electrical circuit for controlling the direction of operation of said driving-motor, a lever bearing against the surface of the music-sheet which is wound upon the roll, and means operable by said lever for making and breaking said electrical circuit.

29. In a machine of the class described, a music-roll having a music-sheet wound thereon, a feed-roll adapted to strip the music-sheet from the music-roll and to wind the same upon itself, a reversible driving-motor for driving said music-roll in a re-winding direction, and means responsive to the length of music-sheet wound upon the feed-roll for controlling said driving-motor.

30. In a machine of the class described, a music-roll having a music-sheet wound thereon, a feed-roll adapted to strip the music-sheet from the music-roll and to wind the same upon itself, a lever bearing upon the music-sheet as it is wound upon the feed-roll, a reversible motor for driving the said music roll, and means operable by said lever for controlling the reversing of said motor.

31. In a machine of the class described, a music-roll having a music-sheet wound thereon, a feed-roll adapted to strip the music-sheet from the music-roll and to wind the same upon itself, a reversible electric driving-motor, driving connections between said motor and said music-roll adapted to drive the latter in the re-wind direction when the motor is operated in one direction, a lever having one end bearing upon the music-sheet as it is wound upon the feed-roll, and means controlled by said lever for reversing said electric motor.

32. In a machine of the class described, a music-roll having a music-sheet wound thereon, a feed-roll adapted to strip the music-sheet from the music-roll and wind the same upon itself, a reversible electric driving-motor, driving connections between said motor and said music-roll adapted to drive the latter in a re-winding direction when the motor is operated in one direction and to release the music-roll and engage the feed-roll when operated in the other direction, an electric circuit controlling the direction of rotation of said motor, a lever having one end bearing upon the surface of the music-sheet as it is wound upon the feed-roll, and means controlled by said lever for controlling said electric circuit.

33. In a machine of the class described, a music-roll having a music-sheet wound thereon, a feed-roll adapted to strip the music-sheet from the music-roll and wind the same upon itself, a reversible electric driving-motor, driving connections between the motor and the said rolls, a lever pivoted intermediate its ends and having one end bearing upon the music-sheet as it is wound upon the feed-roll, a spring contact-finger carried by the opposite end of said lever, a trip-member mounted in the path of movement of the finger, a contact-member mounted to engage said finger as the same snaps past the trip, and means operable by contact between said finger and said contact-member for reversing the direction of rotation of said motor.

34. In a machine of the class described, a frame, a music-roll journaled therein and having a music-sheet wound upon its surface, a feed-roll journaled in the frame and adapted to strip the music-sheet from the music-roll and to wind the same upon its own surface, a reversible electric driving motor, driving connections between said motor and said rolls, said connections being adapted to drive the feed-roll in a playing direction and to release the music-roll when the motor is operated in one direction and to release the feed-roll and drive the music-roll in a rewinding direction when the motor is operated in the opposite direction, a lever pivoted intermediate its ends to said frame, a roller mounted in one end of said lever and bearing upon the surface of the music-sheet as the same is wound upon the feed-roll, a spring for maintaining the roller in contact with the music-sheet, a spring-contact-finger carried by the opposite end of said lever, a trip-plate mounted on the said frame and in the path of motion of said spring-finger, means for adjusting said trip-plate toward and away from the path of motion of the finger, a contact-member carried by the frame in position to be engaged by the spring-finger as it snaps past the trip-plate, and means operable by contact between said spring-finger and said contact means for controlling the direction of rotation of the said motor.

35. In a machine of the class described, a frame, a music-roll journaled in the frame and having a music-sheet wound thereon, a feed-roll journaled in the frame parallel to and spaced away from said music-roll and adapted to strip the music-sheet therefrom, driving means for said feed-roll and means for governing the speed of said driving means, said governing means including a rotatable member adapted to contact with and be driven by the intermediate portion of the music-sheet.

36. In a machine of the character described, a frame, a music-roll journaled in the frame and having a music-sheet wound thereon, a feed-roll journaled in the frame parallel to and spaced away from said music-roll and adapted to strip the music-sheet therefrom, means for driving said feed-roll, a roller journaled in the frame parallel to said feed-roll and music-roll and in contact with the intermediate portion of the music-sheet, a governor driven by said roller, and means operable by said governor for controlling the speed of said feed-roll driving-means.

37. In a machine of the class described, a frame, a music-roll journaled in the frame and having a music-sheet wound thereon, a feed-roll journaled in the frame parallel to and spaced away from said music-roll and adapted to strip the music-sheet from the latter and wind same upon itself, a roller journaled in the frame and lying parallel to but with its axis out of the plane of the axes of said music and feed-rolls, whereby the music-sheet partially encircles said roller, means for driving the feed-roll, means for resisting the unwinding movement of said music-roll, whereby the music-sheet is tensioned and held in driving engagement with the said intermediate roller, a governor driven by the said roller, and means operable by the said governor for controlling the speed of said driving means.

38. In a machine of the class described, a frame, a music-roll journaled therein and having a music-sheet wound upon its surface, a feed-roll journaled in the frame parallel to and spaced away from the music-roll and adapted to strip the music-sheet from the latter and to wind the same upon itself, a contact-roller journaled in the frame parallel to and intermediate the music and feed-rolls and adapted to be driven by engagement with the intermediate portion of the music-sheet, a brush-support mounted in operative relation to said contact-roller, brushes carried by said support and bearing upon the music-sheet at the point where the latter passes over the contact roller, driving means for said feed-roll, a governor driven by said contact-roller, and means for controlling the speed of said driving means from the said governor.

39. In a machine of the class described, a music-roll having a music-sheet wound thereon, a feed-roll adapted to strip the music-sheet from the music-roll and to wind the same upon itself, an electric motor, driving connections between said motor and said feed-roll, an electric circuit supplying power to said motor, a resistance interposed in said circuit and operating to maintain the speed of the motor at a point below its lowest playing speed, a shunt-circuit interposed in said motor-circuit across said resistance, and means responsive to the linear velocity of said music-sheet for controlling the said shunt-circuit.

HENRY K. SANDELL.

In the presence of—
 NELLIE B. DEARBORN,
 A. C. FISCHER.

Copies of this patent may be obtained for five cents each, by addressing the "Commissioner of Patents, Washington, D. C."